United States Patent
Balez et al.

(10) Patent No.: US 10,194,121 B1
(45) Date of Patent: *Jan. 29, 2019

(54) CONTENT CAPTURE

(71) Applicant: Google LLC, Mountain View, CA (US)

(72) Inventors: Mat Balez, San Francisco, CA (US); Nirmal Patel, Mountain View, CA (US); Thad Eugene Starner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,928

(22) Filed: Jul. 24, 2017

Related U.S. Application Data

(63) Continuation of application No. 13/630,492, filed on Sep. 28, 2012, now Pat. No. 9,794,527.

(51) Int. Cl.
| | |
|---|---|
| *H04N 7/18* | (2006.01) |
| *G06F 3/033* | (2013.01) |
| *G08B 13/196* | (2006.01) |
| *F41G 3/16* | (2006.01) |

(52) U.S. Cl.
CPC ....... *H04N 7/185* (2013.01); *G08B 13/19621* (2013.01); *F41G 3/165* (2013.01)

(58) Field of Classification Search
CPC ........ G02B 27/0172; G02B 2027/0178; H04N 7/181; G06T 19/006
See application file for complete search history.

(56) References Cited

U.S. PATENT DOCUMENTS

| | | |
|---|---|---|
| 7,035,091 B2 | 4/2006 | Le et al. |
| 7,525,575 B2 | 4/2009 | Rees et al. |
| 7,945,935 B2 | 5/2011 | Stonedahl |
| 8,042,140 B2 | 10/2011 | Thomas et al. |

(Continued)

OTHER PUBLICATIONS

Clarkson, B. P., "Life Patterns: structure from wearable sensors," Submitted to the Program of Media Arts and Sciences, School of Architecture and Planning on Sep. 19, 2002.

(Continued)

*Primary Examiner* — Tsion B Owens
(74) *Attorney, Agent, or Firm* — McDonnell Boehnen Hulbert & Berghoff LLP

(57) ABSTRACT

A computing device configured to dynamically capture and store experience data received the by the computing device. An example method involves: (a) receiving first experience data that indicates at least one environmental condition; (b) selecting a capture mode from a plurality of capture modes based on the at least one environmental condition, where the capture mode defines a manner of capturing experience data; and (c) causing the computing device to operate in the selected capture mode, where operating in the selected capture mode includes capturing second experience data in the manner defined by the capture mode. The method may optionally additionally involve: (d) after entering the capture mode, receiving third experience data; (e) determining that the capture mode should be exited based on at least the received third experience data; and (f) based on the determination that the capture mode should be exited, exiting the capture mode such that at least one type of experience data is not captured.

20 Claims, 17 Drawing Sheets

(56) References Cited

U.S. PATENT DOCUMENTS

| | | | |
|---|---|---|---|
| 8,082,265 B2 | 12/2011 | Carlson et al. | |
| 8,934,015 B1 * | 1/2015 | Chi | H04L 29/06476 348/158 |
| 2003/0041331 A1 | 2/2003 | Allen et al. | |
| 2004/0204851 A1 | 10/2004 | Fukuyasu | |
| 2004/0268400 A1 | 12/2004 | Barde et al. | |
| 2005/0138659 A1 | 6/2005 | Boccon-Gibod et al. | |
| 2005/0146990 A1 | 7/2005 | Mayer | |
| 2006/0010472 A1 | 1/2006 | Godeny | |
| 2007/0132773 A1 | 6/2007 | Plante | |
| 2007/0133524 A1 | 6/2007 | Kwon | |
| 2008/0192129 A1 | 8/2008 | Walker et al. | |
| 2008/0227067 A1 | 9/2008 | Seymour | |
| 2008/0297586 A1 | 12/2008 | Walker et al. | |
| 2009/0148124 A1 * | 6/2009 | Athsani | G06Q 30/02 386/241 |
| 2009/0171902 A1 * | 7/2009 | MacLaurin | G06Q 10/10 |
| 2009/0319578 A1 | 12/2009 | Orofino, II | |
| 2010/0060752 A1 * | 3/2010 | Tokuyama | G07F 17/32 348/240.3 |
| 2010/0171846 A1 | 7/2010 | Wood et al. | |
| 2010/0190474 A1 | 7/2010 | Rajguru | |
| 2011/0221657 A1 * | 9/2011 | Haddick | G02B 27/017 345/8 |
| 2012/0040650 A1 | 2/2012 | Rosen | |
| 2012/0057039 A1 | 3/2012 | Gardiner et al. | |
| 2012/0123573 A1 | 5/2012 | Goldstein et al. | |
| 2012/0218301 A1 * | 8/2012 | Miller | G02B 27/017 345/633 |
| 2012/0235902 A1 * | 9/2012 | Eisenhardt | A42B 3/042 345/156 |
| 2012/0320013 A1 * | 12/2012 | Perez | H04N 5/91 345/207 |
| 2013/0335573 A1 * | 12/2013 | Forutanpour | G06F 3/011 348/158 |

OTHER PUBLICATIONS

Gemmell, J. et al., "Passive Capture and Ensuing Issues for a Personal Lifetime Store," In CARPE'04: Proceedings of be 1st ACM workshop on Continuous archival and retrieval of personal experiences, pp. 48-55, New York, NY, USA, 2004. ACM Press.

Gurrin, C., "Context and Content Analysis for Managing Personal Media Archives," In: Invited Seminar at MSRA, Beijing, Beijing (2008).

Hayes, G. R., et al., "The Personal Audio Loop: Designing a Ubiquitous Audio-Based Memory Aid," in the Proceedings of the 6th International Symposium on Mobile Human-Computer Interaction (Mobile HCI'04) (S. Brewster and M. Dunlop, eds.) Sep. 13-16, 2004, Glasgow, Scotland, pp. 168-179.

Microsoft Research, MyLifeBits [online], 2012 [retrieved on Aug. 7, 2012]. Retrieved from the Internet:<URL: http://research.microsoft.com/en-us/projects/mylifebits/>.

Patel, N. J.—Darpa Assist [online], 2012 [retrieved on Aug. 7, 2012]. Retrieved from the Internet: <URL: http://nirmalpatel.com/research/assist_html>.

* cited by examiner

| CAPTURE MODE | MANNER OF CAPTURE |
|---|---|
| VIDEO DATA | FRAME RATE VIDEO RESOLUTION |
| IMAGE DATA | IMAGE-CAPTURE RATE IMAGE RESOLUTION |
| AUDIO DATA | AUDIO SAMPLE RATE |
| LOCATION DATA | LOCATION-CAPTURE RATE |
| USER-INPUT DATA | USER-INPUT-CAPTURE RATE |

FIG. 2B

CONTENT CAPTURE

CROSS-REFERENCE TO RELATED DISCLOSURES

This disclosure is a continuation of U.S. patent application Ser. No. 13/630,492 filed on Sep. 28, 2012, which is incorporated herein by reference in its entirety.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, among many other types of computing devices, are increasingly prevalent in numerous aspects of modern life. As computers become progressively more integrated with users' everyday life, the convenience, efficiency, and intuitiveness of the user-interfaces by which users interact with computing devices becomes progressively more important.

The trend toward miniaturization of computing hardware, peripherals, as well as sensors, detectors, and image and audio processors, among other technologies, has helped open up a field sometimes referred to as "wearable computing." Wearable computers are, generally, highly portable, and may be designed to be usable at any time with a minimum amount of "cost" or distraction from the wearer's primary task. That is, a wearable computer user's primary task may not be using the computer. Instead, it may be dealing with their environment while the computer plays a secondary, support, role. One such secondary support role may be the acquisition and storage (or capture) of certain data and/or media corresponding to a user's environment including, for example, pictures, video, audio, text and other such data. Note that such a secondary function need not be performed by a computer that is "wearable" per se; that is, other computing devices (e.g., other portable computing devices) may also support users' activities in a secondary capacity.

The secondary-task nature of such computing devices make them a natural match for computing applications that continuously run in the background, sensing their environment and occasionally proactively acting on behalf of their users. Nonetheless, to date, techniques for utilizing such computing devices, including the capture of environmental data in a preferable or desirable manner, are often considered inconvenient, inefficient, and/or non-intuitive by users. An improvement is therefore desired.

SUMMARY

In one aspect, a method involves: (a) receiving first experience data that indicates at least one environmental condition; (b) selecting a capture mode from a plurality of capture modes based on the at least one environmental condition, where the capture mode defines a manner of capturing experience data; and (c) causing the computing device to operate in the selected capture mode, where operating in the selected capture mode includes capturing second experience data in the manner defined by the capture mode. The method may optionally additionally involve: (d) after entering the capture mode, receiving third experience data; (e) determining that the capture mode should be exited based on at least the received third experience data; and (f) based on the determination that the capture mode should be exited, exiting the capture mode such that at least one type of experience data is not captured. And after selecting the capture mode, the computing device may optionality be configured to provide a prompt to enter the capture mode, where selection of the prompt causes the computing device to operate in the selected capture mode. Such a prompt may be provided without ultimately causing the computing device to actually operate in the selected capture mode.

In another aspect, a computing device is configured to: (a) receive first experience data that indicates at least one environmental condition; (b) select a capture mode from a plurality of capture modes based on the at least one environmental condition, where the capture mode defines a manner of capturing experience data; and (c) cause the computing device to operate in the selected capture mode, where operating in the selected capture mode includes capturing second experience data in the manner defined by the capture mode. The computing device may optionally additionally be configured to: (d) after entering the capture mode, receive third experience data; (e) determine that the capture mode should be exited based on at least the received third experience data; and (f) based on the determination that the capture mode should be exited, exit the capture mode such that at least one type of experience data is not captured. And after selecting the capture mode, the computing device may optionally be configured to provide a prompt to enter the capture mode, where selection of the prompt causes the computing device to operate in the selected capture mode. Such a prompt may be provided without ultimately causing the computing device to actually operate in the selected capture mode.

In yet another aspect, a non-transitory computer-readable medium has program instructions stored thereon that are executable by at least one processor. The program instructions include: (a) instructions for receiving first experience data that indicates at least one environmental condition; (b) instructions for selecting a capture mode from a plurality of capture modes based on the at least one environmental condition, where the capture mode defines a manner of capturing experience data; and (c) instructions for causing the computing device to operate in the selected capture mode, where operating in the selected capture mode includes capturing second experience data in the manner defined by the capture mode. The program instructions may also optionally additionally include: (d) instructions for, after entering the capture mode, receiving third experience data; (e) instructions for determining that the capture mode should be exited based on at least the received third experience data; and (f) instructions for, based on the determination that the capture mode should be exited, exiting the capture mode such that at least one type of experience data is not captured. And after selecting the capture mode, the computing device may optionality be configured to provide a prompt to enter the capture mode, where selection of the prompt causes the computing device to operate in the selected capture mode. Such a prompt may be provided without ultimately causing the computing device to actually operate in the selected capture mode.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 2B shows an example capture-mode and manner-of-capture relationship table.

DETAILED DESCRIPTION

Figure 1A:
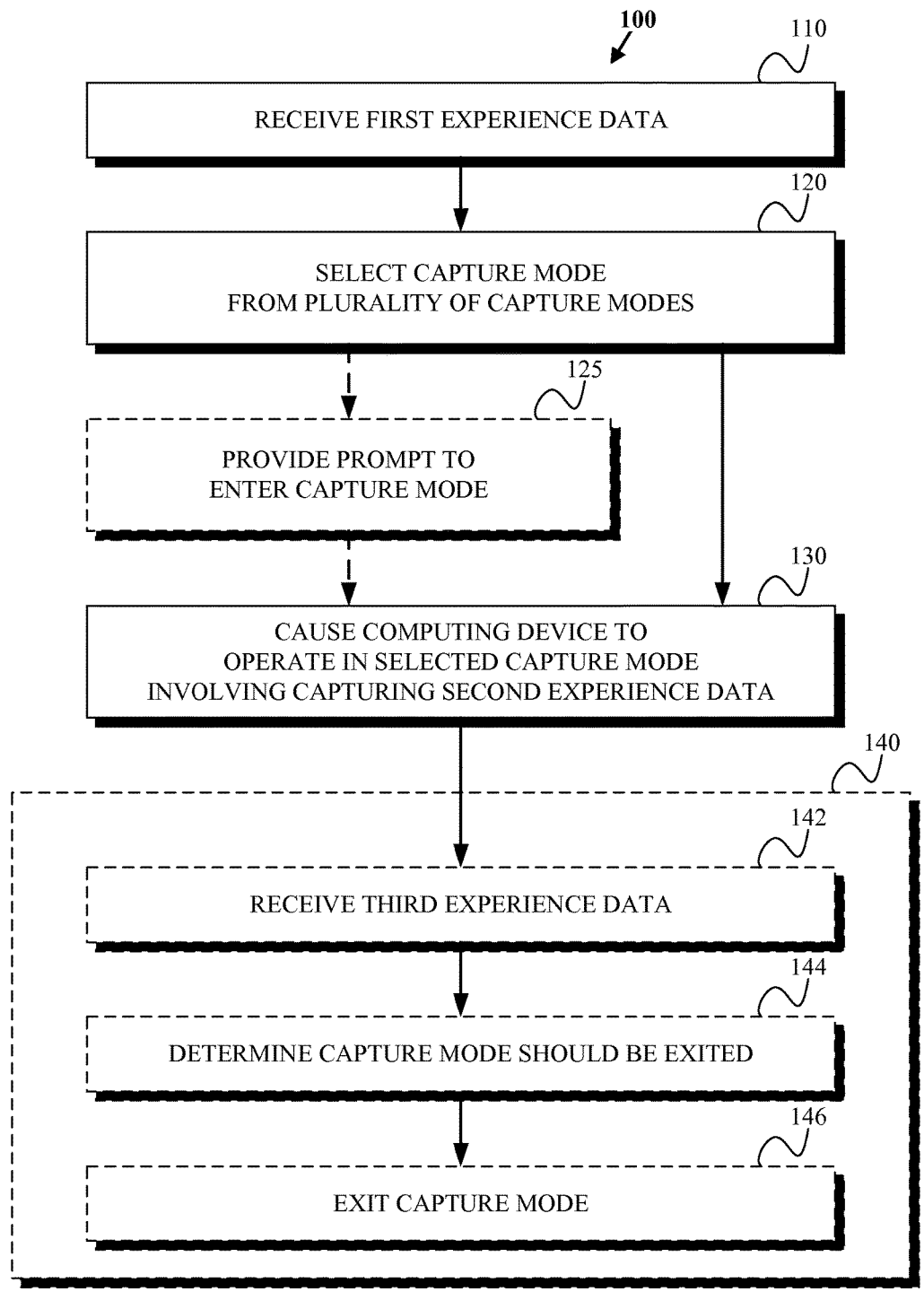
FIGS. 1A-1C show flowcharts depicting aspects of a first example method for dynamic capture of experience data.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are contemplated herein.

1. INTRODUCTION

Modern portable computers may allow users to deal with their environment while the computer plays a secondary, support, role. One such support role may be a background function or function(s) that acquire and store certain data and/or media corresponding to a user's environment including, for example, pictures, video, audio, text and other such data. Such a process may automatically capture and store data, with or without the user's explicit instructions, as the user goes about their everyday life. Further, the user may be prompted, and required, to provide explicit approval to enter a capture mode before the computing device enters a mode where it automatically captures and stores data.

However, in some computing devices, determining when and/or how such data may be captured may be difficult. For instance, automatically capturing such data in a particular desired manner (e.g., a particular frame rate or video resolution for video data, a particular image-capture rate or image resolution for image data, among other examples) may require the user to engage in cumbersome set-up procedures or distracting user interactions while the data is being captured, which may be considered detrimental to the user experience.

The systems and methods described herein, however, may help to provide for more convenient, efficient, and/or intuitive capture of data by a computing device. More specifically, the systems and methods described herein may allow the computing device to initiate as well as terminate the capture and/or storage of particular experience data. And the systems and methods described herein may allow the computing device to capture the data in a manner that is desirable or preferable. Such initiation and termination of the capture and/or storage may be automatic and/or may be accomplished via limited, low-cost (i.e., unobtrusive), user interactions with the computing device.

As a specific, non-limiting, contextual example of a situation in which the systems disclosed herein may be implemented, consider a user of a portable computing device such as a head-mountable display (HMD). In the morning, the HMD may be sitting on the user's kitchen table, immobile, and not being utilized by a user. At that time, while it is possible that the HMD may be receiving various input data (e.g., audio and/or video, among other examples), the HMD may not be capturing (e.g., buffering or permanently storing the experience data in a particular manner) any such input data.

At some point, the user may pick up, begin to wear, and begin to use the HMD. In response to one or both of a recognition that the user has picked up (e.g., via motion sensors) or begun to use (e.g., via recognition of user-input data), the HMD may enter a capture mode, whereby certain input data (i.e., experience data) acquired by the user is automatically captured. Further, the manner in which the experience data is captured may vary depending on certain received experience data, including, for instance, a condition (e.g., a context) of the user's experience. Further still, in some arrangements, prior to entering the capture mode, the user may be prompted to enter the capture mode, such that the user may cause the computing device to either enter, or not enter, the computing mode.

For instance, if the computing device recognizes that the user's current environmental context involves an indoor meeting for work, the computing device may enter a capture mode including capturing experience data such as audio and video data, where the video is captured at a "standard" frame rate and a "medium" video resolution. As another example, if the computing device recognizes that the user's current environmental context involves a birthday party for a child, the computing device may enter a capture mode including capturing experience data such as image data, where an image is captured once every minute at a "medium" image resolution. And as another example, if the computing device recognizes that the user's current environmental context involves a nature hike, the computing device may enter a capture mode including capturing experience data such as image data, where an image is captured once every five minutes at a "high" image resolution.

Those of skill in the art will appreciate that among the various benefits of the methods and systems for dynamic capture of experience data, including automatic initiation and termination of a capture mode, is the benefit of conservation of computing resources (including, e.g., processing cycles, memory, and power). That is, by automatically initiating the capture mode only at times-of-interest, computing resources may be preserved during times that the capture mode is not desired and/or not required. Further, by automatically terminating the capture mode, after the capture mode is entered, at a time when the capture mode is not desired and/or not required, computing resources may be further preserved.

And another benefit of capturing the experience data in a manner associated with the received first experience data, the manner of capture of the experience data may be the dynamic control of the manner in which the experience data is captured with minimal, or no, user interaction. In this way user experience may also be improved.

Those of skill in the art will appreciate that various additional benefits of the methods and systems for dynamic buffering of experience data disclosed herein exist as well. And it should be understood that the examples discussed above are provided for purposes of example and explanation only and should not be taken to be limiting.

2. EXAMPLE METHODS

FIG. 1A is a flow chart depicting an example method 100 for dynamic capture of experience data. Method 100 may be carried out by a wearable computer and, in particular, by a wearable computer that includes an HMD. However, it should be understood that example methods, such as method 100, may be carried out by devices other than a wearable computer, and/or may be carried out by sub-systems in a wearable computer or in other devices. For example, the example method may alternatively be carried out by a device such as a mobile phone that is communicatively coupled to an HMD. Other examples are also possible.

Furthermore, those skilled in the art will understand that the flowchart described herein illustrates functionality and operation of certain implementations of example embodiments. In this regard, each block of the flowchart may represent a module, a segment, or a portion of program code, which includes one or more instructions executable by a processor (e.g., any of those processors described below) for implementing specific logical functions or steps in the process. The program code may be stored on any type of computer readable medium (e.g., any computer readable storage medium or non-transitory media described below), such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Further, for any situations in which the systems discussed herein may collect personal information about users, the users may be provided with an opportunity to opt in/out of programs or features that may collect personal information. For instance, the user may be prompted, and required, to provide explicit approval to enter a capture mode before the computing device enters a mode where it automatically captures and stores data. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

Example method 100 involves, as shown by block 110, a computing device receiving first experience data that indicates at least one environmental condition. At block 120, the method involves the computing device selecting a capture mode from a plurality of capture modes based on the at least one environmental condition, where the capture mode defines a manner of capturing experience data. At block 130, the method involves causing the computing device to operate in the selected capture mode, where operating in the selected capture mode includes capturing second experience data in the manner defined by the capture mode.

Example method 100 may optionally additionally involve blocks 140. At block 142, the method involves, after entering the capture mode, the computing device receiving third experience data. At block 144, the method involves the computing device determining that the capture mode should be exited based on at least the received third experience data. And at step 146, the method involves, based on the determination that the capture mode should be exited, the computing device exiting the capture mode such that at least one type of experience data is not captured.

Example method 100 may optionally additionally involve block 125. At block 125, the method involves providing a prompt to enter the capture mode, where selection of the prompt causes the computing device to operate in the selected capture mode.

Because blocks 125 and 140 are optional, it should be understood that certain of blocks 110, 120, and 130 may be carried out independent of blocks 125 and 140. Alternatively, blocks 125 and 140 may be carried out in addition to blocks 110, 120, and 130.

a. Receive First Experience Data

Method 100 involves, as shown by block 110, a computing device receiving first experience data that indicates at least one environmental condition. As a general matter, receipt of first experience data may involve the receipt and/or analysis of input data, and/or other signals, by the computing device. The first experience data may, for instance, be any type of experience data (discussed further below) received by the computing device. Generally, experience data may correspond to any information regarding the user's environment and/or the user's use of the computing device that the user may have an interest in capturing, analyzing, and/or otherwise using. Such data may reflect, represent, or otherwise correspond to aspects of the user's "experience" as the user interacts with his or her environment and/or the computing device.

In a particular example, the first experience data may be at least one of ((i) audio data, (ii) video data, (iii) motion data, (iv) location data, (v) temporal data, (vi) calendar-event data, (vii) user-input data, (viii) lighting data, and (ix) other-device-capture data. Generally, first experience data may be any experience data that the computing device is configured to recognize as associated with, or otherwise corresponding to, the selection of a capture mode and/or the initiation of capture of experience data. Other examples of first experience data may exist as well.

Figure 1B:
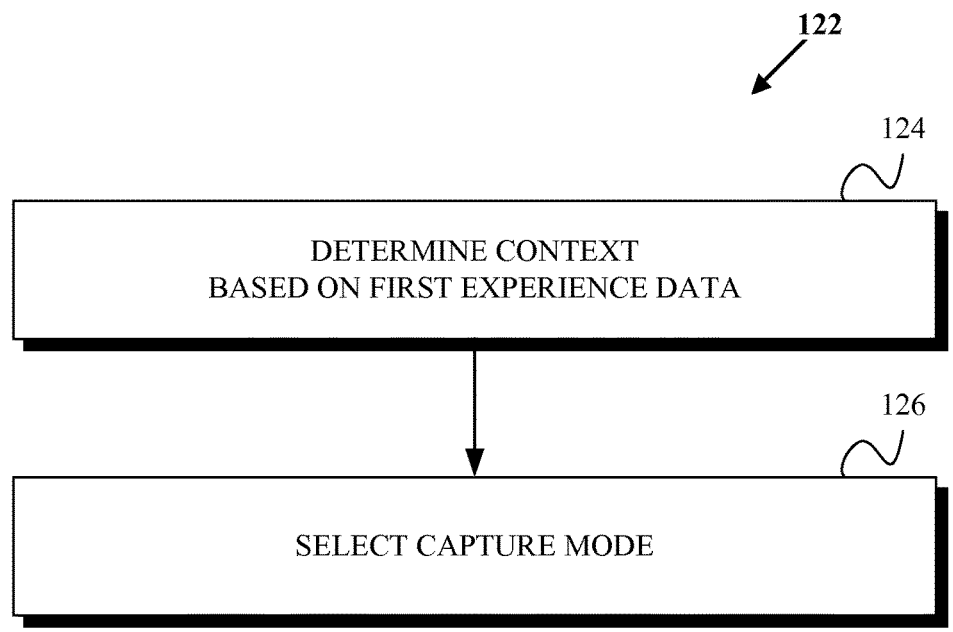
Figure 1C:
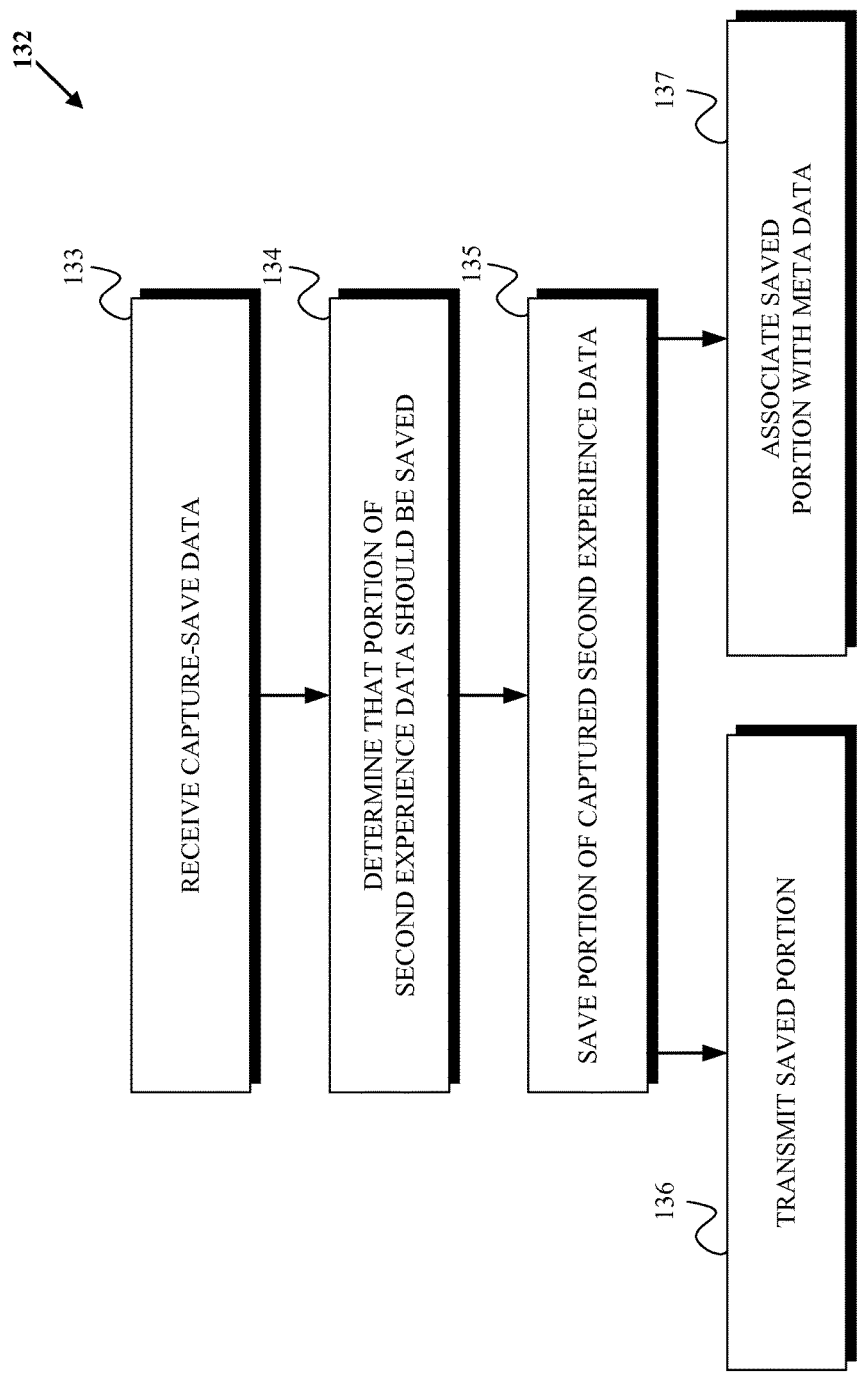
Figure 2A:
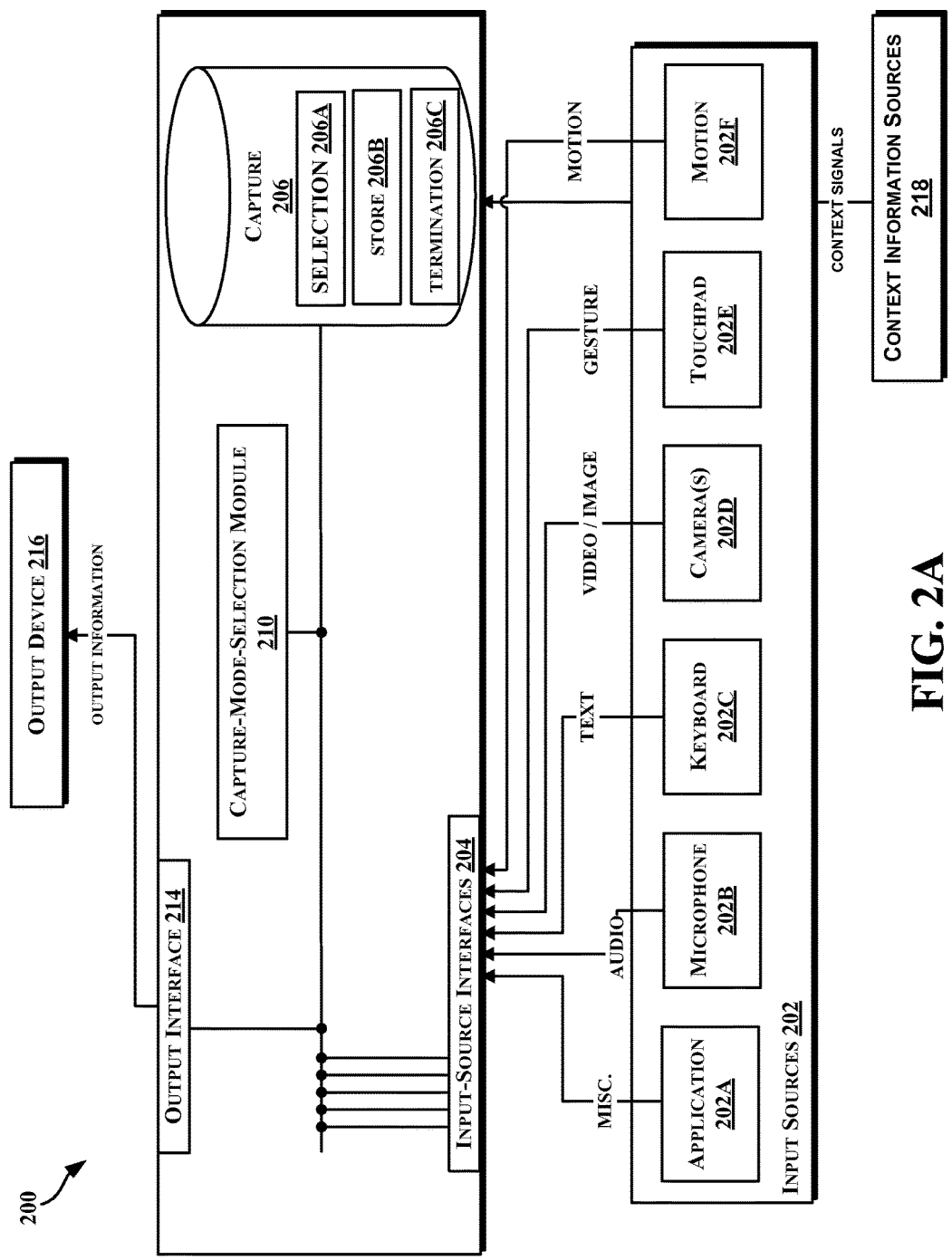
FIG. 2A shows a functional block diagram of an example computing device for dynamic capture of experience data.

For purposes of example and explanation, FIG. 2 shows a functional block diagram of example computing device 200 for dynamic capture of experience data in accordance with an example embodiment. Example computing device 200 is shown as including example functional components that may be used for carrying out aspects of the various methods described herein, including those methods described with respect to FIGS. 1A-1C. As such, aspects of the various methods described with respect to FIGS. 1A-1C may be carried out by computing device 200. Computing device 200 may also include any of those elements, devices, or functional components described with respect to any of those example computing devices, or aspects thereof, described below with respect to FIGS. 6-9. Further, computing device 200 may be implemented as part of a system that includes a head-mountable display, such as computing device 602 described with reference to FIGS. 6A-6F. It should be understood that aspects of example computing device 200 are shown for purposes of example and explanation, that additional and/or alternative functional blocks may be utilized, and that neither example computing device 200, nor any aspects thereof, should be taken to be limiting.

Computing device 200 may be configured to receive various forms of input data via any one of input source interfaces 204, and capture-mode-selection module 210 may be configured to analyze such input data so as to detect environmental conditions related to the initiation or termination of a capture mode and/or the capture of experience data. An "environmental condition," as described herein, may be reflected in any input data, or combination of input data, that is associated with a "trigger," mode of operation, or computing action of computing device 200. For instance, in accordance with method 100, an environmental condition may be any suitable combination of environmental conditions corresponding to one or more of the selection of a capture mode, initiation of a capture mode, the capture of experience data, and/or the termination of the capture mode. An "environmental condition" may take other forms as well.

As shown, computing device 200 includes a number of input-source interfaces 204. In the example embodiment shown, input sources 202 include an application 202A, a microphone 202B, a keyboard 202C, a camera(s) 202D, a touchpad 202E, and a motion sensor 202F. A given input-source interface 204 may be configured to interface with and receive data from a single input source 202. Additionally, or alternatively, a given input-source interface 204 may be configured to simultaneously interface with multiple input sources 202. Other input sources are possible as well.

Configured as such, computing device 200 can receive a number of different modalities of input data from input sources 202, and may receive such inputs simultaneously and/or separately. Such input data may indicate various environmental conditions.

In the embodiment shown, computing device 200 may receive, for example, audio data from microphone 202B, text data (or other character data) from keyboard 202C, video data and/or image data from camera(s) 202D, gesture data from touchpad 202E, and/or motion and/or location data from motion sensor 202F. Thus, in one aspect, computing device 200 may be configured to receive various forms of sensory-input data, such as that as may be received from microphone 202B, camera(s) 202D, and/or other environmental-sensing devices. In another aspect, computing device 200 by be configured to receive various forms of computing-action data, such as that as may be received from application 202A, keyboard 202C, touchpad 202E, and/or other user-input interfaces or devices. Computing device 200 may also be configured to receive other modalities of data in addition, or in the alternative, to those described.

Generally, capture-mode-selection module 210 may be configured to identify at least one environmental condition associated with the received input data. As a general matter, such environmental conditions may correspond to a user's surrounding, "real-world environment." Additionally or alternatively, such environmental conditions may correspond to a state of a computing device of the user, or the user's "computing environment." Some specific examples of particular environmental conditions are discussed below for purposes of example and explanation. However, such examples should not be taken to be limiting.

As one example, computing device 200 may receive input data by way of motion sensor 202F in the form of motion data, and capture-mode-selection module 210 may be configured to analyze the motion data to determine whether a given environmental condition is present. For instance, capture-mode-selection module 210 may use motion-analysis techniques to determine the presence of an environmental condition that a computing device is being worn, or otherwise used, by a user. Further, decisions regarding selecting a capture mode, initiating a capture mode, the manner of capturing experience data, and/or terminating the capture mode may be made based on such a determination.

Computing device 200 may receive audio data via microphone 202B that indicates an environmental condition that is a statement of an individual's name. Accordingly, capture-mode-selection module 210 may use speech-recognition techniques to analyze the received audio data and make a determination that the individual's name is present in the received audio data. Further, decisions regarding selecting a capture mode, initiating a capture mode, the manner of capturing experience data, and/or terminating the capture mode may be made based on such a determination.

Computing device 200 may receive video data via camera 202D that indicates an environmental condition that is a video and/or picture including an individual's face. Accordingly, capture-mode-selection module 210 may use facial-recognition techniques to analyze the received video data and make a determination that the individual is present in the received video data. Further, decisions regarding selecting a capture mode, initiating a capture mode, the manner of capturing experience data, and/or terminating the capture mode may be made based on such a determination.

Computing device 200 may also receive lighting data via camera 202D that indicates an environmental condition that is an amount of ambient light that is present in the user's environment. Accordingly, capture-mode-selection module 210 may use light-analysis techniques to analyze the ambient light and make a determination of whether it is presently suitable to capture video and/or image data. Further, decisions regarding selecting a capture mode, initiating a capture mode, the manner of capturing experience data, and/or terminating the capture mode may be based on such a determination.

Computing device 200 may receive other-device-capture data via applications 202A that indicates an environmental condition that is a number of other computing devices within a given proximity of the user are currently engaged in a capture mode. Accordingly, capture-mode-selection module 210 may analyze the other-device-capture data to make a determination of whether it may be desirable to capture video and/or image data (for instance, if a relatively large number of closely-located computing devices are currently engaged in a capture mode). Further, decisions regarding selecting a capture mode, initiating a capture mode, the manner of capturing experience data, and/or terminating the capture mode may be based on such a determination.

Computing device 200 may receive user-input data via any one of application 202A, microphone 202B, keyboard 202C, camera 202D, touchpad 202E, and/or motion sensor 202F. In an embodiment, experience data may include the user-input data that indicates an environmental condition that is on-screen activity. For example, consider the case where application 202A is a map program. Computing device 200 may be configured to receive user-input data corresponding to a series of user inputs into the map program indicating directions from a first location to a second location. Computing device 200 may also be configured to receive screen captures, graphics, and/or video corresponding to the user's interaction with the map program as a result of the user input. Further, decisions regarding selecting a capture mode, initiating a capture mode, the manner of capturing experience data, and/or terminating the capture mode may be made based on such user-input data.

In one example, the first experience data may comprise user-input data that indicates an environmental condition that is an instruction to enter the capture mode. For instance, the user may utilize a combination of application 202A and touchpad 202E to provide a touch input that indicates to computing device 200 that it should select a given capture mode.

Alternatively and/or additionally, the first experience data may comprise user-input data that indicates an environmental condition that is a system use associated with entering the capture mode. For instance, the utilization of a map program as described above may be associated with selecting a given capture mode.

Computing device 200 may receive calendar-event data via application 202A that indicates an environmental condition that is a calendar event. For example, consider the case where application 202A is a calendar program. Computing device 200 may be configured to receive calendar-event data corresponding to an event, such as a meeting or other life event (such as a birthday), that provides some indication of the real-life activity that the user is involved in at the time of the calendar event. Correspondingly, computing device 200 may receive temporal data, such as date and/or time, from any suitable temporal source, such as an internal and/or remote clock. Further, decisions regarding initiating a capture mode, the manner of capturing experience data, and/or terminating the capture mode may be made based on such calendar-event data.

And it is of note that, before receiving the first experience data, the computing device may receive capture-mode-approval data indicating approval to operate in an automatic capture mode. A user may provide such an approval to ensure and/or verify that the user approves, generally, of entering a capture mode. In an embodiment, without such approval, the computing device may not engage in the certain of the other functions described herein including selecting and/or entering a capture mode. In this way, the user may be prompted, and required, to provide explicit approval to enter the capture mode before the computing device enters a mode where it automatically captures and stores data.

b. Select Capture Mode

At block 120, the method involves the computing device selecting a capture mode from a plurality of capture modes based on the at least one environmental condition, where the capture mode defines a manner of capturing experience data.

In accordance with block 120, computing device 200 may maintain capture database 206. Capture database 206 may include selection data 206A for identifying input data (i.e., first experience data) corresponding to the selection of a capture mode. Capture database 206 may store data in a table that associates various first experience data and/or environmental conditions with the selection of a given capture mode. It should be understood that capture database 206 is shown for purposes of example and explanation only, and should not be taken to be limiting.

As a general matter, in accordance with block 120, once first experience data is recognized as associated with the selection of the capture mode, the capture mode may be selected. For instance, once any of those examples of first experience data including various environmental conditions described above is received and/or recognized by computing device 200, the computing device may select a corresponding capture mode. Herein, various examples of selecting a capture mode based on environmental conditions indicated by first experience data are described. However, this is for purposes of example and explanation only, and should not be taken to be limiting. Other examples of selection a capture mode based on an environmental condition indicated by first experience data may exist.

As shown by example flowchart 122 of FIG. 1B, selecting a capture mode may involve, at step 124, determining a context based on at least the first experience data and, at step 126, determining that the capture mode should be initiated based on the determined context. Accordingly, capture-mode-selection module 210 may be configured to associate one or more of various contexts with received first experience data. Such a context may be, for example, one of time, location, computing task, physical task, and/or user mood, among other examples. As a general matter, computing device 200, or capture-mode-selection module 210, may identify the context based on an environmental condition indicated by at least one of a sensory input and a user-input, among other examples.

However, computing device 200 may also be configured to identify the context based on one or more context signals (that indicates an environmental condition) received, as first experience data, from one or more context information sources 218. Many types of information, from many different sources, may serve as context signals or provide information from which context signals may be derived. For example, context signals may indicate various environmental conditions such as: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by the computing device, (w) items that have been detected in the past by the computing device, (x) items that other devices associated with computing device (e.g., a "trusted" device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some embodiments, determining a context may involve determining a quantitative or qualitative value of a single context signal (e.g., the time of the day, a current location, or a user status). The context may also be determined based on a plurality of context signals (e.g., the time of day, the day of the week, and the location of the user). In other embodiments, computing device 200 may extrapolate from the information provided by context signals. For example, a determined context may be determined, in part, based on context signals that are provided by a user (e.g., a label for a location such as "work" or "home", or user-provided status information such as "on vacation").

In a further aspect, context information sources 218 may include various sensors that provide context information. These sensors may be included as part of, or may be communicatively coupled, to computing device 200. Examples of such sensors include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others. Context information sources 218 may be, or may be similar to, any one of input sources 202.

Computing device 200 may also be configured to acquire context signals from various data sources. For example, context-evaluation modules may be configured to derive information from network-based weather-report feeds, news feeds and/or financial-market feeds, a system clock providing a reference for time-based context signals, and/or a location-determination system (e.g., GPS), among other examples.

In another aspect, computing device 200 may also be configured to learn, over time, about a user's preferences in certain contexts. For example, whenever an explicit instruction to associate a given context with given received first experience data, computing device 200 may store, in data storage, a record of such an instruction. This record may include the context and/or the first experience data identified by the instruction, as well as context information that is available at or near the receipt of the instruction.

Computing device 200 may periodically evaluate such records and determine that a correlation exists between explicit instructions to associate a given context with given first experience data, and a certain context. When such a correlation exists, computing device 200 may be updated to specify that the context should be attributed to given first experience data upon detection of the corresponding context.

Additionally, or alternatively, an example system may be configured for an "on-the-fly" determination of whether a current context has historically been associated with certain contexts and first experience data. In particular, computing device 200 may compare a current context to historical context data, and determine whether certain contexts have been associated with certain first experience data. If an association is found, then computing device 200 may automatically associate the given context with the given first experience data.

Further, as stated above, the selected capture mode generally defines a manner of capturing experience data. The manner of capturing experience data defined by the capture mode is discussed further below with respect to capture-mode and manner-of-capture relationship table 250 and step 130.

The examples of selecting a capture mode set forth above are but a few of the many potential examples of approaches, methods, or techniques for determining that a capture mode should be initiated. Those of skill in the art will appreciate that many other suitable specific approaches to selecting a capture mode in accordance with the disclosure contained herein may exist.

c. Provide Prompt to Enter Capture Mode

At block 125, the method involves providing a prompt to enter the capture mode, where selection of the prompt causes the computing device to operate in the selected capture mode. As stated above the functions described with respect to block 125 is optional and may be carried out together with or independently of certain other functions described herein.

As a general matter, with reference to example computing device 200, the prompt to enter the capture mode may be provided by any suitable output device 216 via output interface 214. Output device 216 may, for example, take the form of a graphical display and/or an audio-output device (such as a speaker and/or headphones). Other examples of suitable output devices may exist as well.

In an embodiment where output device 216 is a graphical device, the prompt to enter the capture mode may be provided via a graphical user interface (GUI), or a particular element thereof. For instance, the GUI may display a content element that asks a user whether the user would like to enter the capture mode. The prompt may also include a button element that allows the user to select the prompt (e.g., by clicking, selecting, or otherwise choosing the button element) that enables the user to provide input data to the computing device that indicates the user's preference to either enter, or not enter, the capture mode. Other examples of prompts to enter the capture mode may exist as well.

Thus, in accordance with block 125, the computing device may be configured to receive input data indicating a selection of the prompt and, based on the received input data, cause the computing device to operate in the selected capture mode. Further, by dismissing the prompt, or otherwise informing the system that the user would like to not enter the capture mode, the user may cause the computing device to not operate in the selected capture mode.

Further, in accordance with block 125, the prompt may indicate the manner of capturing experience data. For instance, in an example where the selected capture mode defines the capture of video data at a "medium" frame rate and a "high" video resolution, the prompt may indicate that the capture mode is "video at a medium frame rate and high video resolution." Such an indication may be provided via the GUI displayed by the graphical display.

Further still, various aspects of the capture mode may be chosen, varied, and/or otherwise specified by the user. For instance, the user may be able to select a frame rate or video resolution from among "low," "medium," or "high" options.

In an embodiment where output device 216 is an audio-output device, the prompt to enter the capture mode may be provided as a sound. For instance, the audio-output device may play audio that asks a user whether the user would like to enter the capture mode. The user may then provide a response, perhaps via speech recognition (or other suitable input technique), that enables the user to provide input data to the computing device that indicates the user's preference to either enter, or not enter the capture mode.

In a particular example, computing device 200 may, in accordance with block 110, receive first experience data that is image data including a Quick Response (QR) code. In such a case, it may be desirable for the computing device to capture the QR code, and, for instance, to also enter a capture mode that involves the capture of all QR codes that the computing device senses are within the user's environment. However, before doing so, in accordance with block 125, the computing device may prompt the user to seek the user's approval to enter such a capture mode. In this way, if the user is uninterested in the information provided by the QR code, the user may avoid wasting computing resources associated with entering such a computing mode. On the other hand, if the user is interested in the information provided by the QR code, that QR code (and future QR codes) may be captured, later providing the user with a history of QR codes that may help the user reconstruct his/her experience during the period of time in which the QR codes were captured.

Figure 1D:
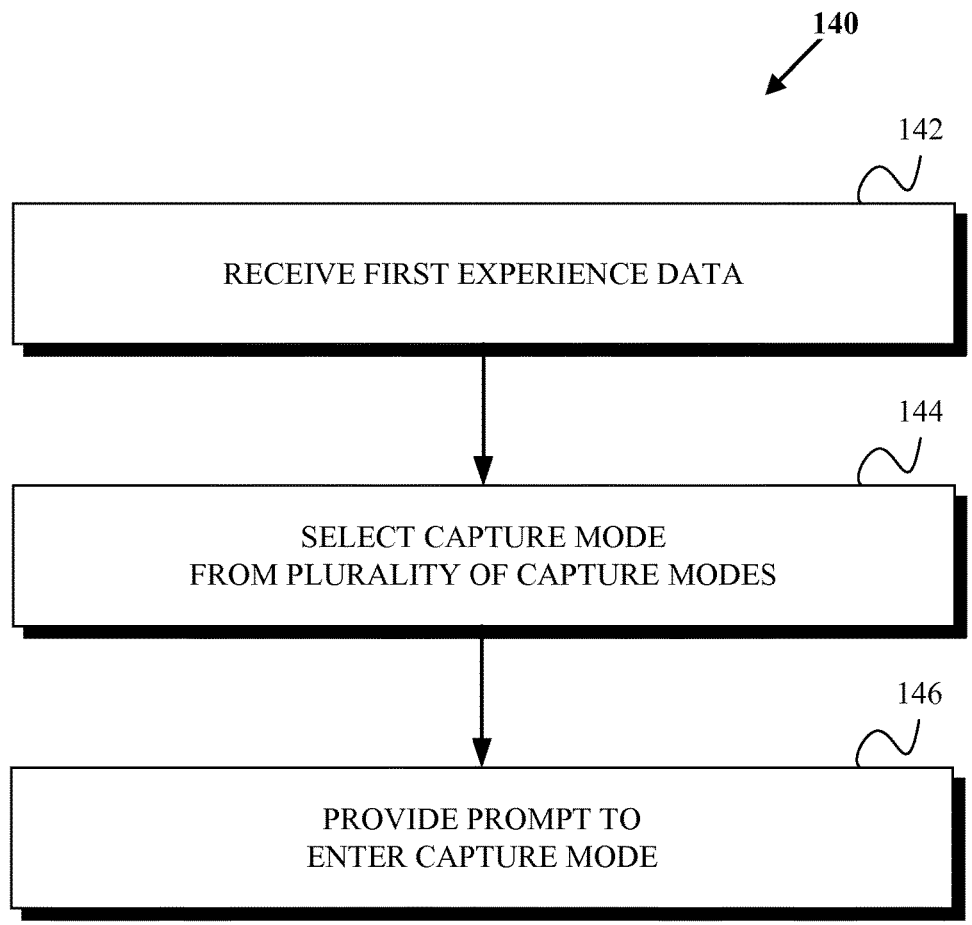
FIG. 1D shows a flowchart depicting aspects of a second example method for dynamic capture of experience data.

For purposes of example and explanation, FIG. 1D shows a flowchart depicting aspects of a second example method for dynamic capture of experience data that involves providing a prompt to enter a capture mode. Example method 140 is shown to, among other purposes, demonstrate that the function of providing a prompt to enter a capture mode may be performed independent of at least some other steps described with respect to example method 100.

Example method 140 involves, as shown by block 142, a computing device receiving first experience data that indicates at least one environmental condition. Block 142 may be carried out similar to block 110 described above. At block 144, the method involves the computing device selecting a capture mode from a plurality of capture modes based on the at least one environmental condition, where the capture mode defines a manner of capturing experience data. Block 144 may be carried out similar to block 120 described above. And at block 146, the method involves providing a prompt to enter the capture mode, where selection of the prompt causes the computing device to operate in the selected capture mode, and where operating in the selected capture mode comprises capturing second experience data in the manner defined by the capture mode. Block 144 may be carried out similar to block 125 described above.

d. Cause Computing Device to Operate in Selected Capture Mode Involving Capturing Second Experience Data At block 130, the method involves causing the computing device to operate in the selected capture mode, where operating in the selected capture mode includes capturing second experience data in the manner defined by the capture mode.

In accordance with block 130, the manner of capturing second experience data may differ depending on, or may otherwise be determined based on, the environmental condition indicated by the first experience data and, correspondingly, the selected capture mode. As one example, where the capture mode involves the capture of video data, the manner of capture may involve at least one of a particular frame rate and a particular video resolution. The particular frame rate and the particular video resolution may be associated with the first experience data. As another example, where the capture mode involves the capture of image data, the manner of capture may involve at least one of a particular image-capture rate and a particular image resolution. The particular image-capture rate and the particular image resolution may be associated with the first experience data. As another example still, where the capture mode involves the capture of audio data, the manner of capture may involve a particular audio sample rate. The particular audio sample rate may be associated with the first experience data. As yet another example still, where the capture mode involves the capture of location data, the manner of capture may involve a particular location-capture rate. The particular location-capture rate may be associated with the first experience data. And as yet another example still, where the capture mode involves the capture of user-input data, the manner of capture may involve a particular user-input-capture rate. The particular user-input-capture rate may be associated with the first experience data.

For purposes of example and explanation FIG. 2B shows an example capture-mode and manner-of-capture relationship table 250, which may be used and/or referenced by the computing device to help identify a manner-of-capture associated with the received first experience data. Table 250 may, for example, be stored as a look up table in data storage accessible by capture-mode-selection module 210. For instance, table 250 may be stored as a part of selection data 206A. However, table 250 should not be taken to be limiting.

As shown, table 250 may indicate various associations between particular types of capture modes 252A and manners of capture 252B. For instance, table 250 may indicate that given certain events, situations, or contexts, the computing device should capture a particular type of second experience data associated with capture mode 252A using a particular manner of capture 252B.

In particular, video data capture mode 254A may be associated with particular frame rates or video resolutions 254B. For instance, if upon entering the capture mode the computing device recognizes that the user's current environmental context involves an indoor meeting for work, the capture mode may define that the experience data captured may include audio and video data, where the video is captured at a "standard" frame rate (e.g., 32 frames per second) and a "medium" video resolution (e.g., 640×480 pixels). These particular examples of manner of capture of video data are provided for purposes of example and explanation only, and should not be taken to be limiting. Other examples of manner of capture of video data may exist as well.

Image data capture mode 256A may be associated with particular image-capture rates or image resolutions 256B. For instance, if upon entering the capture mode the computing device recognizes that the user's current environmental context involves a birthday party for a child, the capture mode may define that the experience data captured may include image data, where an image is captured once every minute at a "medium" image resolution (e.g., 640×480 pixels). And as another example, if upon entering the capture mode the computing device recognizes that the user's current environmental context involves a nature hike, the capture mode may define that the experience data captured may include image data, where an image is captured once every five minutes at a "high" image resolution (e.g., 720×480 pixels). These particular examples of manner of capture of image data are provided for purposes of example and explanation only, and should not be taken to be limiting. Other examples of manner of capture of image data may exist as well.

Audio data capture mode 258A may be associated with particular audio sample rates. For instance, if upon entering the capture mode the computing device recognizes that the user's current environmental context involves an indoor meeting for work, the capture mode may define that the experience data captured may include audio data, where the audio is captured at a "medium" sample rate (e.g., 48,000 Hz). And as another example, if upon entering the capture mode the computing device recognizes that the user's current environmental context involves a concert, the capture mode may define that the experience data captured may include audio data, where the audio is captured at a "high" sample rate (e.g., 88,200 Hz). These particular examples of manner of capture of audio data are provided for purposes of example and explanation only, and should not be taken to be limiting. Other examples of manner of capture of audio data may exist as well.

Location data capture mode 260A may be associated with particular location-capture rates 260B. For instance, if upon entering the capture mode the computing device recognizes that the user's current environmental context involves a nature hike, the capture mode may define that the experience data captured may include location data, where the user's location is captured at a "medium" capture rate (e.g., once every minute). And as another example, if upon entering the capture mode, the computing device recognizes that the user's current environmental context involves participation in a bike race, the capture mode may define that the experience data captured may include location data, where the location data is captured at a "high" capture rate (e.g., once every second). These particular examples of manner of capture of location data are provided for purposes of example and explanation only, and should not be taken to be limiting. Other examples of manner of capture of location data may exist as well.

User-input data capture mode 262A may be associated with particular user-input-capture rates 262B. For instance, if upon entering the capture mode the computing device recognizes that the user's current context involves use of a map application, the capture mode may define that the experience data captured may include user-input data, where the user's input is captured at a "medium" capture rate (e.g., a screen shot of the map program is taken once every second). And as another example, if upon entering the capture mode, the computing device recognizes that the user's current context involves use of a web-browsing application, the capture mode may define that the experience data captured may include user-input data, where the user's input is captured at a "low" capture rate (e.g., a screen shot of the web-browsing application is taken once every minute). These particular examples of manner of capture of user-input data are provided for purposes of example and explanation only, and should not be taken to be limiting. Other examples of manner of capture of user-input data may exist as well.

Capturing second experience data may involve storing the experience data in a local and/or remote storage device. In an example embodiment, the second experience data may be stored in a buffer-storage device.

Figure 3:
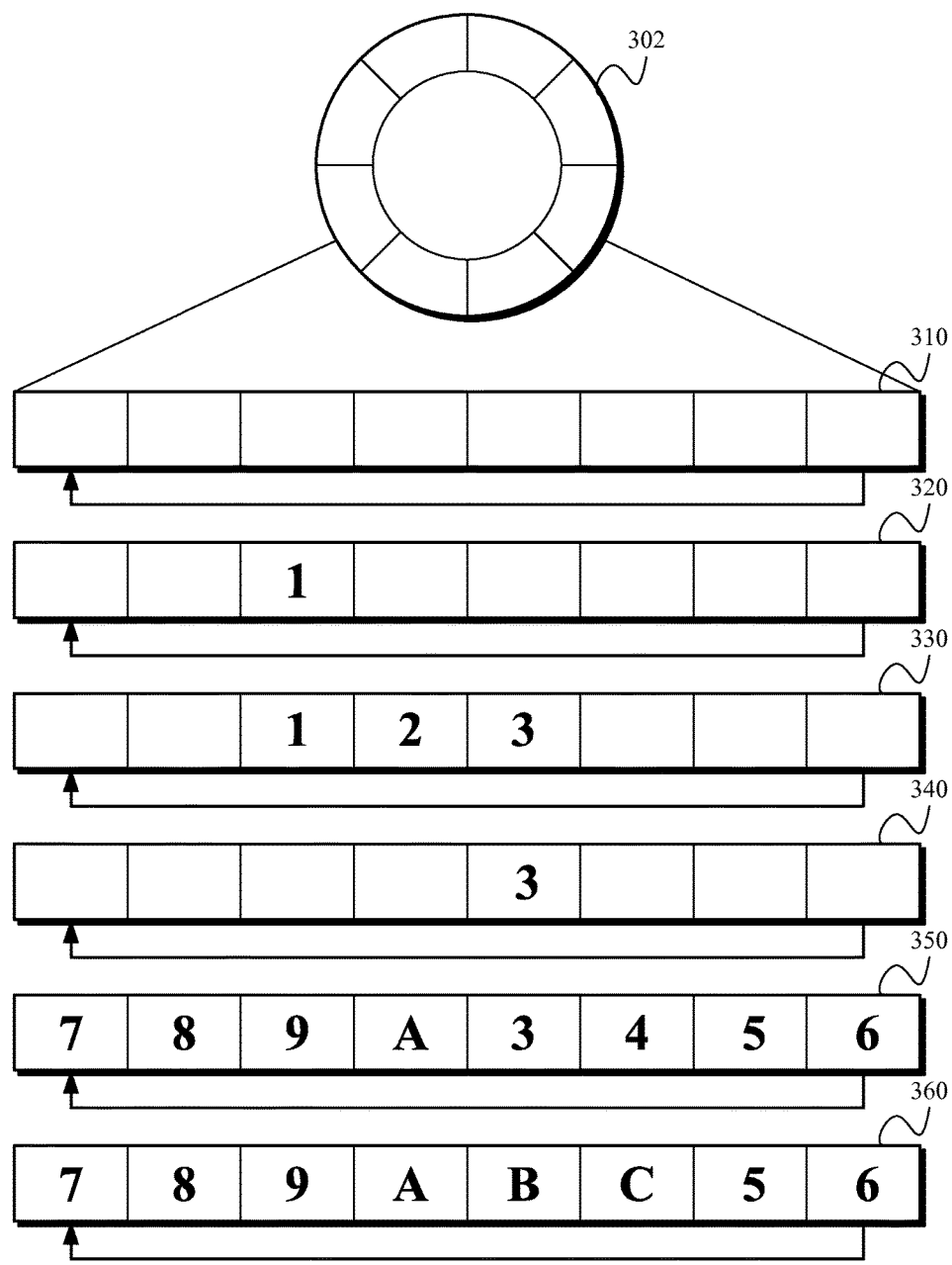
FIG. 3 shows a simplified diagram of certain functional aspects of an example buffer-storage device.

For purposes of example and explanation, FIG. 3 shows a simplified diagram of certain functional aspects of an example buffer-storage device 302. In the example shown, buffer-storage device 302 is shown as a circular buffer, however this is not necessary. Any other data structure suitable for buffering data may be utilized alternatively and/or additionally including, for example any other suitable fixed-sized buffer, variable-sized buffer, cyclic buffer, and/or ring buffer, among other examples.

In an embodiment, buffer-storage device 302 has a predefined length, or number of blocks. According to the example shown in FIG. 3, buffer-storage device 302 has eight blocks. As shown at Time 310, each block in buffer-storage device 302 may initially be empty. That is, buffer-storage device 302 may initially have no data buffered upon entering the capture mode, or at any point while in the capture mode.

Upon initiating the capture mode, buffer-storage device 302 may store data in one or more of its blocks. For instance, in accordance with Time 320, data representing the numeral "1" may be written into one of the blocks of buffer-storage device 302. At later Time 330, more data may be written to buffer-storage device 302. In the example shown, data representing the numerals "2" and "3," respectively, are appended to blocks after data representing the numeral "1."

Data previously written to buffer-storage device 302 may be removed from the buffer. For instance, the oldest values inside the buffer may be removed. Accordingly, at later Time 340, the numerals "1" and "2" have been removed from their respective blocks, leaving the buffer with just the numeral representing "3."

At some later time, buffer-storage device 302 may have data written to each block such that it is "full." Accordingly, at later Time 350, buffer-storage device 302 is shown as having data written to each of its eight blocks including, from left to right, data representing the numerals "7," "8," "9," data representing the letter "A," and data representing the numerals "3," "4," "5," and "6."

Nonetheless, buffer-storage device 302 may be configured such that when it is full, and the addition of subsequent data is desired and/or required, then buffer-storage device 302 may overwrite the oldest data with the subsequent data. Accordingly, at Time 360, buffer-storage device 302 is shown as storing subsequent data representing letters "B" and "C," which have replaced the data representing the numerals "3" and "4," respectively.

It should be understand that the functional aspects of example buffer-storage device 302 described above are provided for purposes of example and explanation only and should not be taken to be limiting. Those of skill in the art will appreciate that various buffer-storage devices, arrangements, and/or functions may be utilized in accordance with the disclosure herein.

In an embodiment, before entering the capture mode, the computing device may determine the predetermined amount of time for which the computing device captures second experience data based on a capture-time system setting. For instance, the predetermined amount of time during which the computing device captures second experience data may be a default, or user-defined, amount of time that is stored and referenced by the computing device as part of its system settings.

Additionally or alternatively, the computing device may determine the predetermined amount of time based on a capture-time user input. The capture-time user input may be a user-specified amount of time. For instance, upon determining that the capture mode should be initiated in accordance with block 120, the computing device may prompt the user to specify the amount of time. And, additionally or alternatively, the computing device may determine the predetermined amount of time based on the received first experience data. For instance, capture-mode-selection module 210 may be configured to calculate and/or determine the predetermined amount of time depending on the source of the first experience data. In an embodiment, capture database 206 may specify various respective predetermined amounts of time for various events. The predetermined amount of time may be indefinite such that the second experience data is captured so long as the computing device is within the capture mode.

The computing device may also be configured to store the captured second experience data in an additional data-storage device that is, for example, more permanent than example data-storage device 302. In general, such a data-storage device may not be a buffer-storage device, or circular storage device, such as that described with respect to FIG. 3. Such a data-storage device may be local and/or remote from the computing device.

More particularly, as shown in FIG. 1C in accordance with example flowchart 132, before determining that the capture mode should be exited in accordance with optional block 144 described below, at block 133, the computing device may receive capture-save data. At block 134, the computing device may then determine that a portion of the captured second experience data should be saved based on at least the received capture-save data. And at block 135, the computing device may save the portion of the captured at least one type of experience data.

In an embodiment, the capture-save data may take any of those forms described above with respect to the experience data. More particularly, the capture-save data may be at least one of (i) audio data, (ii) video data, (iii) motion data, (iv) location data, (v) temporal data, (vi) calendar-event data, and (vii) user-input data. Further, capture database 206 may include store data 206B for identifying input data that is capture-save data.

In another embodiment, the capture-save data may include audio data. In accordance with such an embodiment, the audio data may indicate an implicit voice command. Such an implicit voice command may passively instruct the computing device to store the captured data. For instance, the implicit voice command may be any suitable statement by the user that suggests that the captured data may be desirable to save such as, "That sounds interesting," "It is nice to meet you," or "I will have to remember that." Additionally or alternatively, the audio data may indicate an explicit voice command. Such an explicit voice command may affirmatively instruct the computing device to store the captured data. For instance, the explicit voice command may be any suitable statement by the user that suggests the captured experience data should be saved such as, "Save," "Keep the last minute," or "Keep the next minute."

In another embodiment, the capture-save data may include motion data. For instance, the motion data may indicate a degree of motion that exceeds a motion threshold. For instance, the user and/or computing device may exceed a motion threshold when the user begins running, falls down, and/or is in a vehicular accident, among other examples. Such motion data may be recognized as capture-save data as it may be desirable to store captured experience data associated with such events.

Figure 4A:
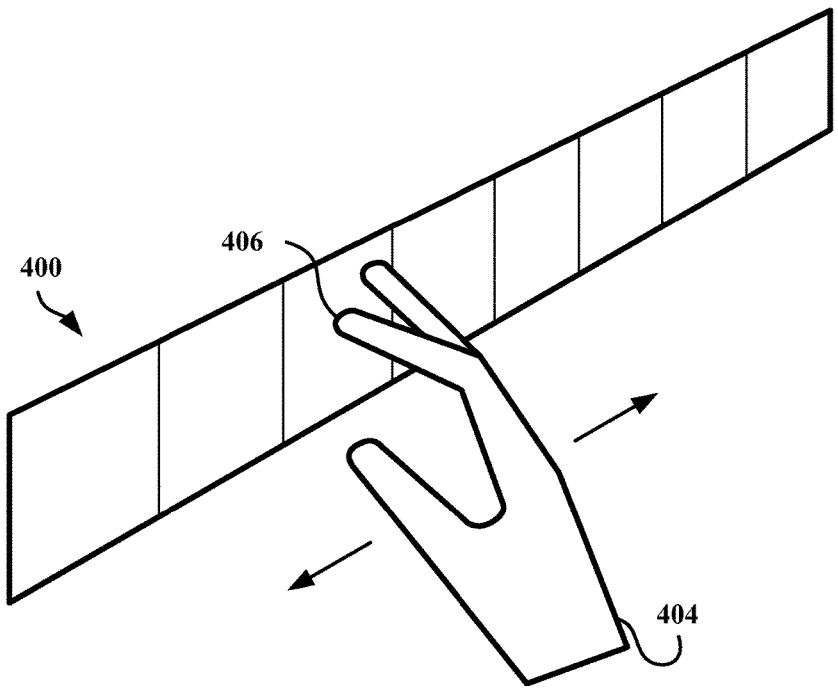
FIGS. 4A-4B show an example touch input, the touch input indicating a portion of captured experience data that should be saved.
Figure 4B:
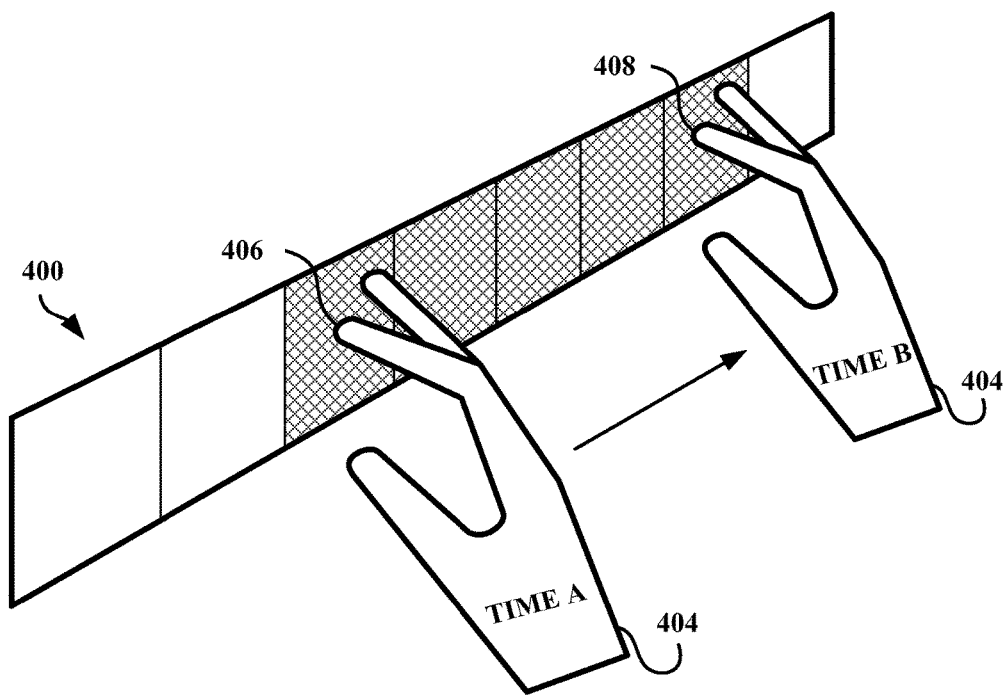

In another embodiment, the received capture-save data may indicate touch-input data. For instance, the touch-input data may indicate the portion of the captured second experience data that should be saved. For purposes of example and explanation, FIGS. 4A and 4B show an example touch input indicating a portion of captured second experience data that should be saved. As shown in FIG. 4A, touchpad 400 may be configured to receive touch inputs from user 404 as a result of the user touching 406 touchpad 400. Such a touch input as depicted in FIG. 4A may indicate that some portion of the captured second experience data is to be saved.

In accordance with FIG. 4B, the user may then use a further touch input, such as a swipe along touchpad 400, to indicate the portion of the captured second experience data that should be saved. For instance touch input 406 may indicate the captured second experience data should begin to be saved at any suitable given point in time including, for example, a particular time in the past (e.g., 1 minute in the past), the present time, or a particular time in the future (e.g., 1 minute in the future). The user may then "swipe" to indicate the portion of the captured second experience data that should be saved relative to touch input 406. For instance, a swipe "forward" to touch input 408 may indicate an amount of time after that point in time indicated by touch input 406. Alternatively, a swipe "backward" may indicate an amount of time before that point in time indicated by touch input 406.

It is of note that in an embodiment, the capture-save data may be the first experience data. That is, it is possible that at the same time the capture mode is initiated, the captured second experience data may be saved.

As noted above, the captured second experience data may be stored local and/or remote to the computing device. Returning to example flowchart 132, in accordance with block 136, for example, after saving the portion of the captured second experience data, the computing device may transmit the saved portion of the captured second experience data to at least one of (i) a mobile device and (ii) a network server. Indeed, in another embodiment, for example, experience data may be transmitted (e.g., streamed) to such a mobile device and/or server prior to local buffering by the computing device.

Figure 5A:
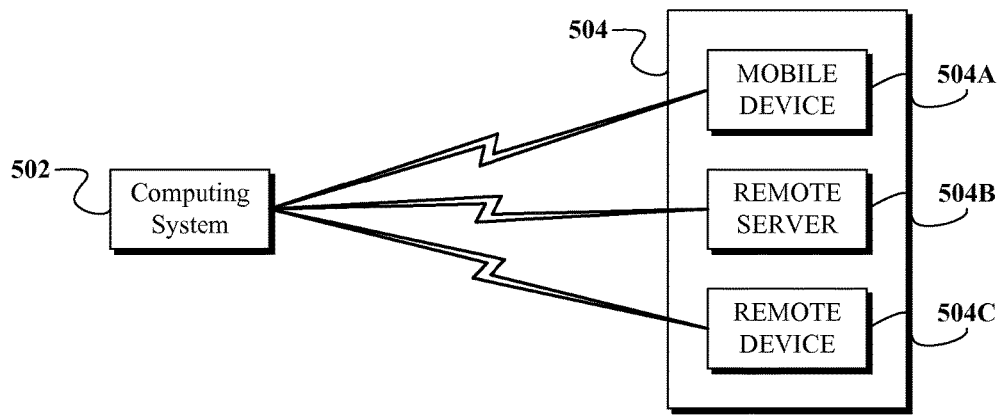
FIG. 5A shows an example of a computing device in direct communication with a remote device.
Figure 5B:
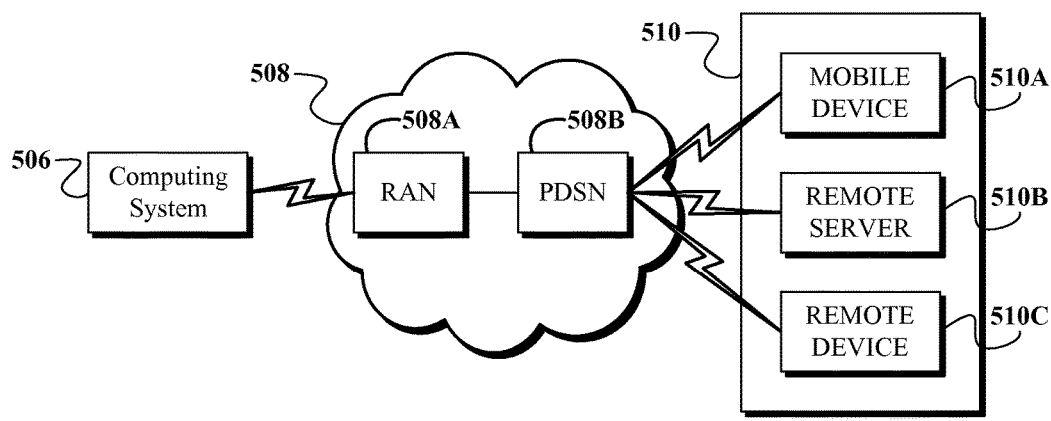
FIG. 5B shows an example of a computing device in communication with a remote device via a telecommunications network.
Figure 5C:
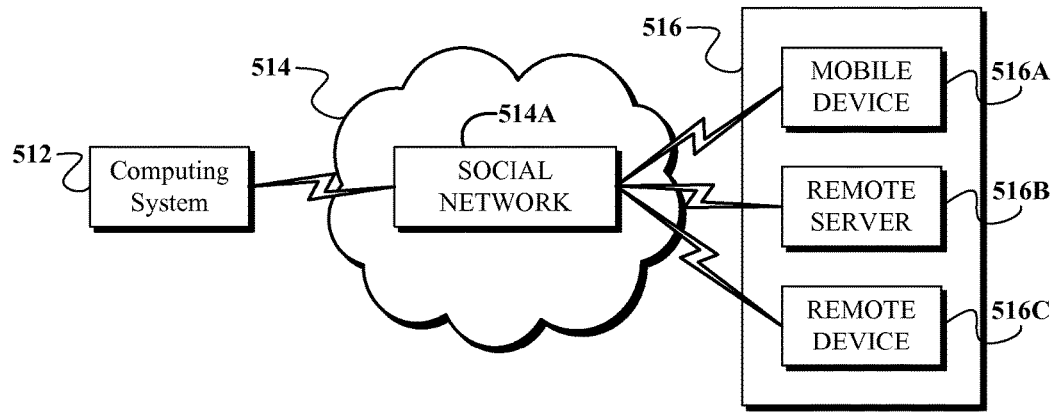
FIG. 5C shows an example of a computing device in communication with a remote device via a social network.

For purposes of example and explanation, FIG. 5A shows an example of a computing device in direct communication with a remote device, FIG. 5B shows an example of a computing device in communication with a remote device via a telecommunications network, FIG. 5C shows an example of a computing device in communication with a remote device via a social network. The computing device may transmit the saved portion of the captured second experience data, and/or stream captured second experience data, to a remote device using any such example communication arrangements. Other suitable communication arrangements may be utilized as well.

In one example, the user may transmit the captured portion of the experience data directly to the remote device over any suitable near-field and/or short-range communication protocol. For instance, in FIG. 5A computing device 502 is shown as being in direct wireless communication with each remote device in set of remote devices 504. Set of remote devices 504 may include mobile device 504A, remote server 504B, and remote device 504C (which may be any other suitable computing device), among other examples. In such a situation, computing device 502 may transmit the experience data using any suitable communication protocol including, but not limited to, Bluetooth, WiFi, and/or ZigBee protocols. Other suitable communication protocols may exist as well.

It should be understood that the example set forth with respect to FIG. 5A is provided for purposes of example and explanation only. Other techniques for transmitting experience data using near-field and/or short range techniques may exist as well.

In another example, the computing device may transmit the captured portion of the experience data to the remote device over a telecommunications network, which may involve a combination of wireless and wired technologies. For instance, the computing device may, in one example, send a multimedia messaging service (MMS) message to the remote device. In FIG. 5B, computing device 506 is shown as accessing telecommunications network 508 by way of a wireless communication link with a radio access network (RAN) 508A. RAN 508A is in turn communicatively coupled to a packet data serving node (PDSN) 508B. PDSN 508B may then be communicatively coupled to each remote device in set of remote devices 510, either directly or indirectly through one or more additional network devices. Set of remote devices 510 may include mobile device 510A, remote server 510B, and remote device 510C (which may be any other suitable computing device), among other examples. In this way, computing device 506 is in communication with each remote device in set of remote devices 510 by way of a communication path including RAN 508A and PDSN 508B. Computing device 506 may therefore transmit the captured second experience data to set of remote devices 510 by way of that communication path.

It should be understood that the example set forth with respect to FIG. 5B is provided for purposes of example and explanation only. Other techniques for transmitting experience data over a telecommunication network may exist as well.

In yet another example, the computing device may transmit the captured portion of the experience data to the remote device via a particular communications network, such as the Internet. For instance, in FIG. 5C, computing device 512 is shown as accessing social network 514A via a connection to Internet 514. Note that each remote device in set of remote devices 516 may also access social network 514A via a connection to Internet 514. Set of remote devices 516 may include mobile device 516A, remote server 516B, and remote device 516C (which may be any other suitable computing device), among other examples. Computing device 512 may transmit the captured second experience data by uploading the experience data to social network 514A via Internet 514. In turn, each remote device in set of remote devices 516 may retrieve (i.e., download) the captured second experience data, perhaps in response to a prompt or notification, from social network 514A via Internet 514. Alternatively, each remote device in set of remote devices 516 may receive the experience data as a result of social network 514A "pushing" the experience data via Internet 514.

It should be understood that the example set forth with respect to FIG. 5C is provided for purposes of example and explanation only. Other techniques for transmitting experience data via the Internet and/or a social network may exist as well.

Returning again to example flowchart 132, in accordance with block 137, the computing device may additionally or alternatively, after saving the portion of the captured second experience data, associate the saved portion of the captured second experience data with meta data comprising at least one of (i) a timestamp, (ii) a media type, (iii) a content indicator, (iv) a context indicator, (v) an individual indicator, and (vi) a location indicator. The timestamp may, for example, indicate the time the experience data was captured. The media type may, for example indicate a file type (e.g., *.gif*, *.jpg*, *.avi*, etc.) of the experience data and/or may indicate a content type (e.g., picture, sound, movie, etc.) of the experience data. The content indicator may, for example, indicate a characteristic of the content of the experience data (e.g., the presence of a landmark in a picture). The individual indicator may, for example identify a person present in the experience data (e.g., the person's face recognized in a picture). The location indicator may, for example, indicate the location at which the experience data was acquired. Other examples of meta data may exist as well.

e. Receive Third Experience Data

At block 142, the method involves, after entering the capture mode, the computing device receiving third experience data. As stated above the functions described with respect to blocks 142, 144, and 146 are optional and may be carried out together with or independently of certain other functions described herein.

As a general matter, receipt of third experience data may involve the receipt and/or analysis of input data, and/or other signals, by the computing device. The third experience data may be at least one of (i) audio data, (ii) video data, (iii) motion data, (iv) location data, (v) temporal data, (vi) calendar-event data, (vii) user-input data, (viii) lighting data, and (ix) other-device-capture data. Generally, third experience data may be any experience data that the computing device is configured to recognize as associated with ending, or otherwise terminating, the capture of experience data. Other examples of third experience data may exist as well.

Third experience data may take any of those forms described above with respect to experience data, including first experience data and/or capture-save data. Indeed, third experience data may take the form of any input data described above with respect to FIG. 2. Third experience data may be received via any one of input source interfaces 204, and capture-mode-selection module 210 may be configured to analyze such third experience data to detect an environmental condition associated with the termination of the capture mode.

Further, the third experience data may comprise user-input data, and the user-input data may indicate an instruction to exit the capture mode. For instance, the user may utilize a combination of application 202A and touchpad 202E to provide a touch input that indicates to computing device 200 that it should exit the capture mode.

Alternatively and/or additionally, the third experience data may comprise user-input data, and the user-input data may indicate a system use associated with exiting the capture mode. For instance, the utilization of a video-playback program may be associated with exiting the capture mode. Other examples of third experience data may exist and those examples described herein should not be taken to be limiting.

f. Determine Capture Mode should be Exited

At block 144, the method involves the computing device determining that the capture mode should be exited based on at least the received third experience data.

In accordance with block 144, computing device 200 may maintain capture database 206, as described above. Capture database 206 may include termination data 206C for identifying input data (i.e., third experience data) corresponding to the termination of a capture mode. Capture database 206 may store data in a table that associates various third experience data with the termination of a capture mode.

As a general matter, in accordance with block 146 (discussed below), once third experience data is recognized as associated with the termination of the capture mode, the capture mode may be terminated. For instance, once any of those examples of third experience data associated with terminating the capture mode described herein is received and/or recognized by computing device 200, the computing device may exit the capture mode. Herein, various examples of terminating a capture mode based on first experience data are described. However, this is for purposes of example and explanation only, and should not be taken to be limiting.

Other examples of termination of a capture mode based on third experience data may exist.

As one example, computing device 200 may receive input data by way of motion sensor 202F in the form of motion data, and capture-mode-selection module 210 may be configured to analyze the motion data to determine whether an environmental condition associated with the termination of the capture mode is present. For instance, capture-mode-selection module 210 may use motion-analysis techniques to make a determination that a computing device is not being worn, or is not being used, by a user. In accordance with such an example, the third experience data may include the motion data, and the motion data may indicate a degree of motion that does not exceed a motion threshold. In such a case, the computing device may exit the buffering mode.

As another example, determining that the capture mode should be exited may involve determining a context based on at least the third experience data and determining that the capture mode should be terminated based on the determined context. Accordingly, capture-mode-selection module 210 may be configured to associate one or more of various contexts with received third experience data. Such a context may be, for example, one of time, location, computing task, physical task, and/or user mood, among other examples. As a general matter, computing device 200, or capture-mode-selection module 210, may identify the context based on at least one of a sensory input, a user-input, or an analysis of an environmental condition, among other examples. The context may be determined in accordance with any of those techniques and/or approaches described above with respect to determining that the capture mode should be initiated.

g. Exit Capture Mode

At step 146, the method involves, based on the determination that the capture mode should be exited, the computing device exiting the capture mode such that at least one type of experience data is not captured. Thus, upon exiting the capture mode, the computing device may no longer capture experience data.

Before exiting the capture mode, the computing device may provide an indication that the system will be exiting the capture mode. The indication may be at least one of a visual indication, an audible indication, and a haptic indication.

For example, the indication may provide an indication of an amount of time left until, or a "countdown," until the computing device exits the capture mode. For instance, the visual indication may involve a numerical countdown until the time the capture mode is exited. Alternatively, the visual indication may involve any other suitable graphical indication providing an indication of the expiration of time until the capture mode is exited (e.g., an hour glass emptying, a status bar filling, and/or a clock hand rotating, etc.). The audible indication may involve a statement indicating the amount of time until the capture mode is exited (e.g., "The capture mode will end in five seconds" or an audible countdown of "5, 4, 3, 3, 1"). Alternatively, the audible indication may involve a series of beeps, or a consistent tone, that either decreases or increases in volume or pitch until the capture mode is exited. The haptic indication may involve a vibration that increases or decreases in strength until the capture mode is exited. Alternatively, the haptic indication may involve a series of pulses that increase in frequency and/or strength until the capture mode is exited. Other examples of indications that may provide an indication of the amount of time left until the capture mode is exited may exist as well.

3. EXAMPLE SYSTEMS AND DEVICES a. Example Wearable Computer Device

Figure 6A:
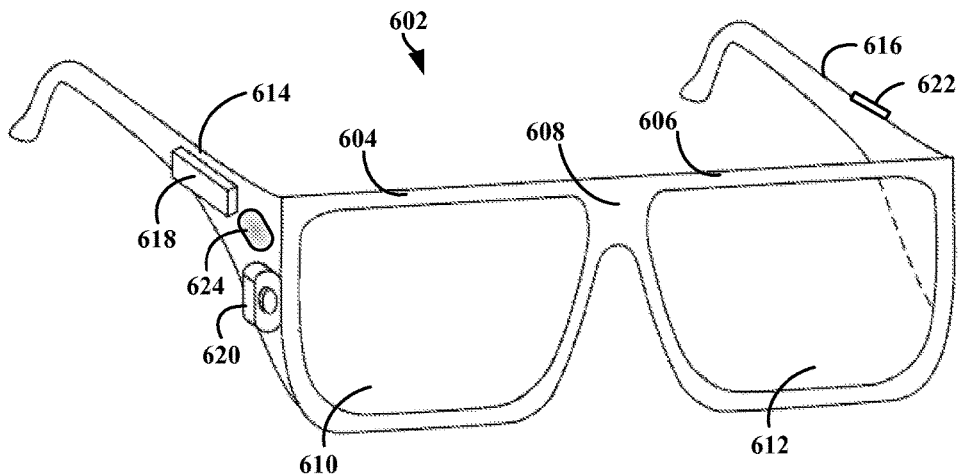
FIGS. 6A-6F shows an example system for dynamic capture of experience data.

FIG. 6A illustrates an example system for dynamic capture of experience data. The system is shown in the form of a wearable computing device. While FIG. 6A illustrates a head-mountable device 602 as an example of a wearable computing device, other types of wearable computing devices could additionally or alternatively be used. As illustrated in FIG. 6A, the head-mountable device 602 has frame elements including lens-frames 604, 606 and a center frame support 608, lens elements 610, 612, and extending side-arms 614, 616. The center frame support 608 and the extending side-arms 614, 616 are configured to secure the head-mountable device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mountable device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements 610, 612.

The extending side-arms 614, 616 may each be projections that extend away from the lens-frames 604, 606, respectively, and may be positioned behind a user's ears to secure the head-mountable device 602 to the user. The extending side-arms 614, 616 may further secure the head-mountable device 602 to the user by extending around a rear portion of the user's head. Additionally or alternatively, for example, the system may connect to or be affixed within a head-mountable helmet structure. Other possibilities exist as well.

The system may also include an on-board computing device 618, a video camera 620, a sensor 622, and a finger-operable touch pad 624. The on-board computing device 618 is shown to be positioned on the extending side-arm 614 of the head-mountable device 602; however, the on-board computing device 618 may be provided on other parts of the head-mountable device 602 or may be positioned remote from the head-mountable device 602 (e.g., the on-board computing device 618 could be connected by wires or wirelessly connected to the head-mountable device 602). The on-board computing device 618 may include a processor and memory, for example. The on-board computing device 618 may be configured to receive and analyze data from the video camera 620, the sensor 622, and the finger-operable touch pad 624 (and possibly from other sensory devices, user-interfaces, or both) and generate images for output by the lens elements 610 and 612. The on-board computing device 618 may additionally include a speaker or a microphone for user input (not shown). An example computing device is further described below in connection with FIG. 8B.

The video camera 620 is shown positioned on the extending side-arm 614 of the head-mountable device 602; however, the video camera 620 may be provided on other parts of the head-mountable device 602. The video camera 620 may be configured to capture images at various resolutions or at different frame rates. Video cameras with a small form-factor, such as those used in cell phones or webcams, for example, may be incorporated into an example embodiment of the system.

Further, although FIG. 6A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 420 may then be used to generate an augmented reality where computer generated images appear to interact with the real-world view perceived by the user.

The sensor 622 is shown on the extending side-arm 616 of the head-mountable device 602; however, the sensor 622 may be positioned on other parts of the head-mountable device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mountable device 602. However, the finger-operable touch pad 624 may be positioned on other parts of the head-mountable device 602. Also, more than one finger-operable touch pad may be present on the head-mountable device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 6B:
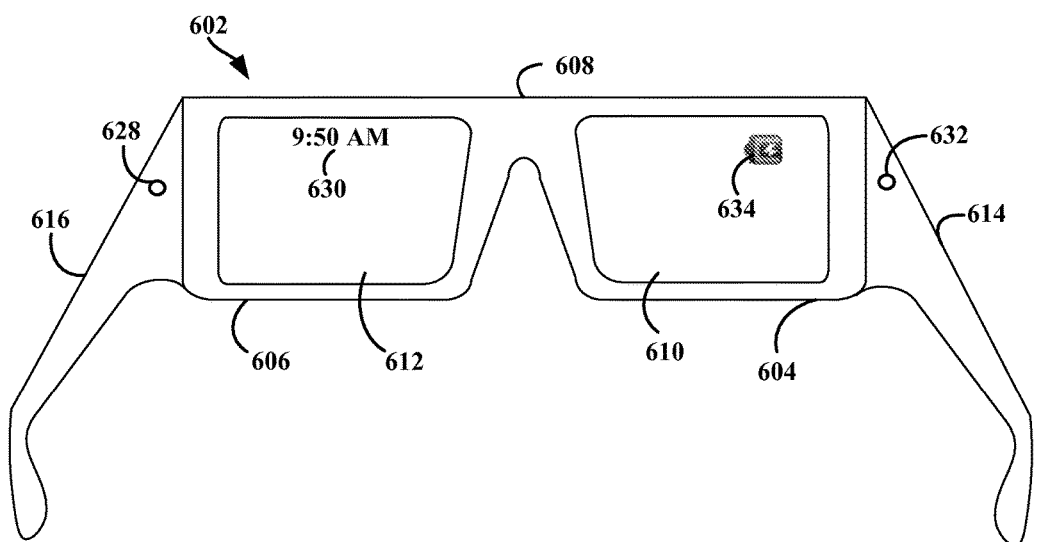

FIG. 6B illustrates an alternate view of the system illustrated in FIG. 6A. As shown in FIG. 1B, the lens elements 610, 612 may act as display elements. The head-mountable device 602 may include a first projector 628 coupled to an inside surface of the extending side-arm 416 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may be omitted (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or light emitting diode (LED) source and scanning system could be used to draw a raster display directly onto the retina of one or more of the user's eyes. Other possibilities exist as well.

Figure 6C:
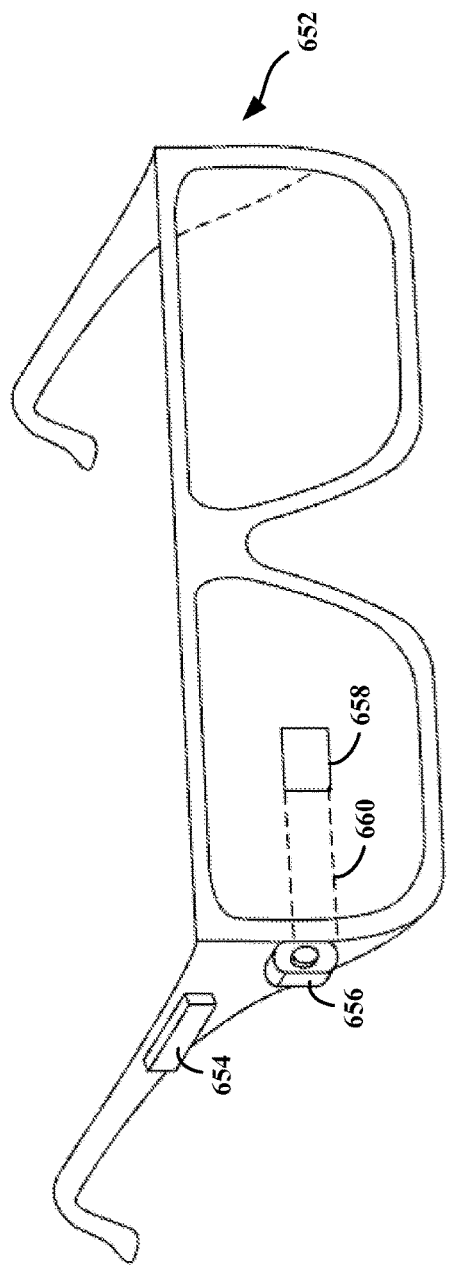

FIG. 6C illustrates an example system for receiving, transmitting, and displaying data. The system is shown in the form of a wearable computing device 652. The wearable computing device 652 may include frame elements and side-arms such as those described with respect to FIGS. 6A and 6B. The wearable computing device 652 may additionally include an on-board computing device 654 and a video camera 656, such as those described with respect to FIGS. 6A and 6B. The video camera 656 is shown mounted on a frame of the wearable computing device 652; however, the video camera 656 may be mounted at other positions as well.

Figure 6D:
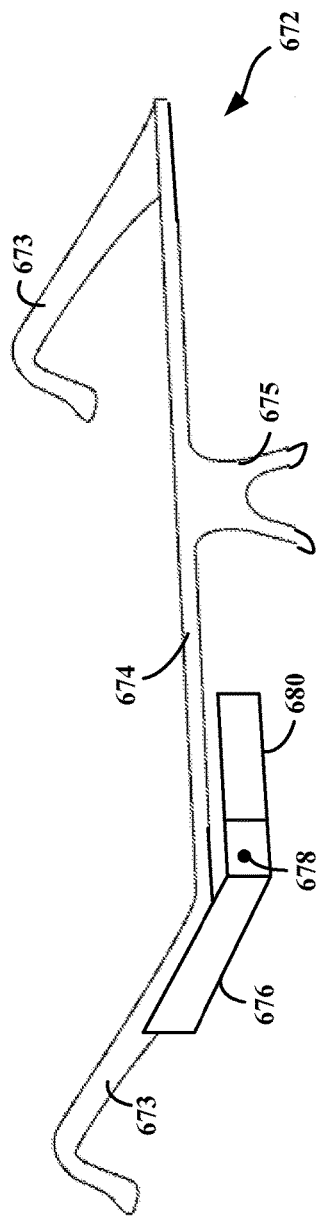

As shown in FIG. 6D, the wearable computing device 652 may include a single display 658 which may be coupled to the device. The display 658 may be formed on one of the lens elements of the wearable computing device 652, such as a lens element described with respect to FIGS. 6A and 6B, and may be configured to overlay computer-generated graphics in the user's view of the physical world. The display 658 is shown to be provided in a center of a lens of the wearable computing device 652; however, the display 658 may be provided in other positions. The display 658 is controllable via the computing device 654 that is coupled to the display 658 via an optical waveguide 660.

FIG. 6D illustrates an example system for receiving, transmitting, and displaying data. The system is shown in the form of a wearable computing device 672. The wearable computing device 672 may include side-arms 673, a center frame support 674, and a bridge portion with nosepiece 675. In the example shown in FIG. 6D, the center frame support 674 connects the side-arms 673. The wearable computing device 672 does not include lens-frames containing lens elements. The wearable computing device 672 may additionally include an on-board computing device 676 and a video camera 678, such as those described with respect to FIGS. 6A and 6B.

The wearable computing device 672 may include a single lens element 680 that may be coupled to one of the side-arms 673 or the center frame support 674. The lens element 680 may include a display such as the display described with reference to FIGS. 6A and 6B, and may be configured to overlay computer-generated graphics upon the user's view of the physical world. In one example, the single lens element 680 may be coupled to a side of the extending side-arm 673. The single lens element 680 may be positioned in front of or proximate to a user's eye when the wearable computing device 672 is worn by a user. For example, the single lens element 680 may be positioned below the center frame support 674, as shown in FIG. 6D.

Figure 6E:
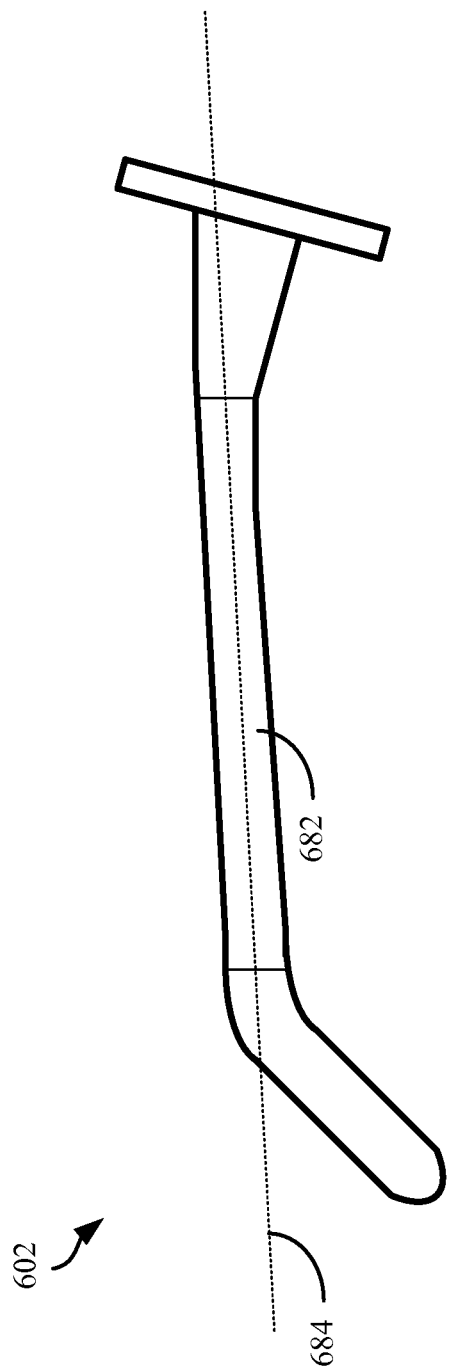

FIG. 6E depicts yet another alternate view of another example wearable computing device. More particularly, FIG. 6E depicts an alternate view of an extending side-arm. As shown, the extending side-arm is configured to include a touch sensitive interface 682, having a longitudinal axis 684, along the side arm. Touch sensitive interface 682 may be a finger-operable touch pad as described above. Generally, touch sensitive interface 682 may take on any suitable touch-based interface form including, for example, electrode-based, capacitance-based, and/or resistance-based forms, among others.

Figure 6F:
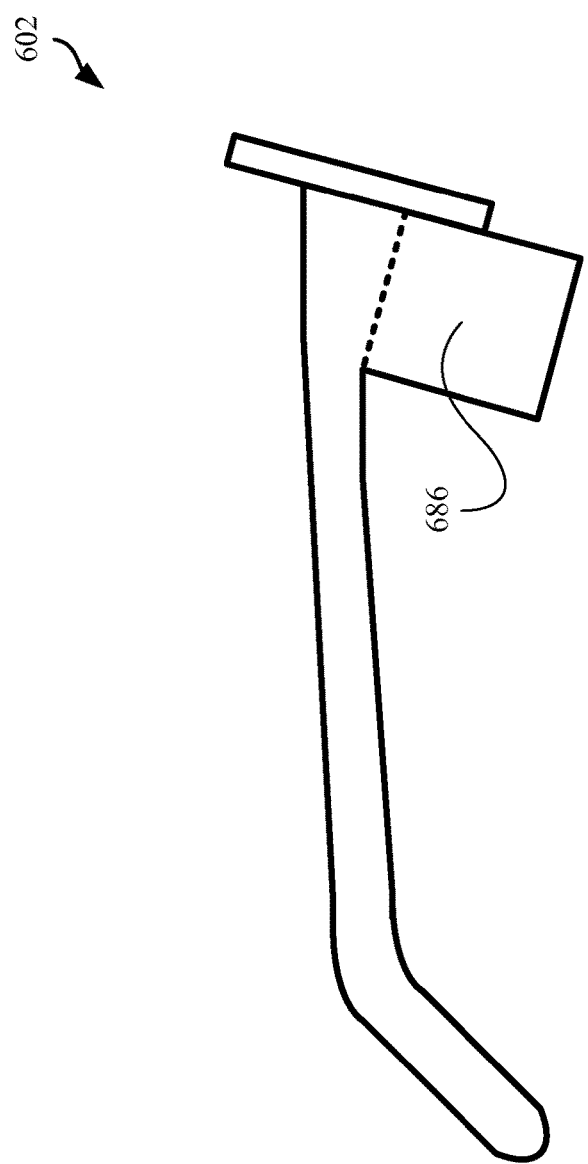

FIG. 6F depicts yet another alternate via of another example wearable computing device. More particularly, FIG. 6F depicts an alternate view of an extending side-arm. As shown, the extending side-arm is configured to include a touch sensitive interface 686, attached to the extending side-arm. Touch sensitive interface 686 may be a finger-operable touch pad as described above. Generally, touch sensitive interface 686 may take on any suitable touch-based interface form including, for example, electrode-based, capacitance-based, and/or resistance-based forms, among others.

b. Example Mobile Computing Device

Figure 7:
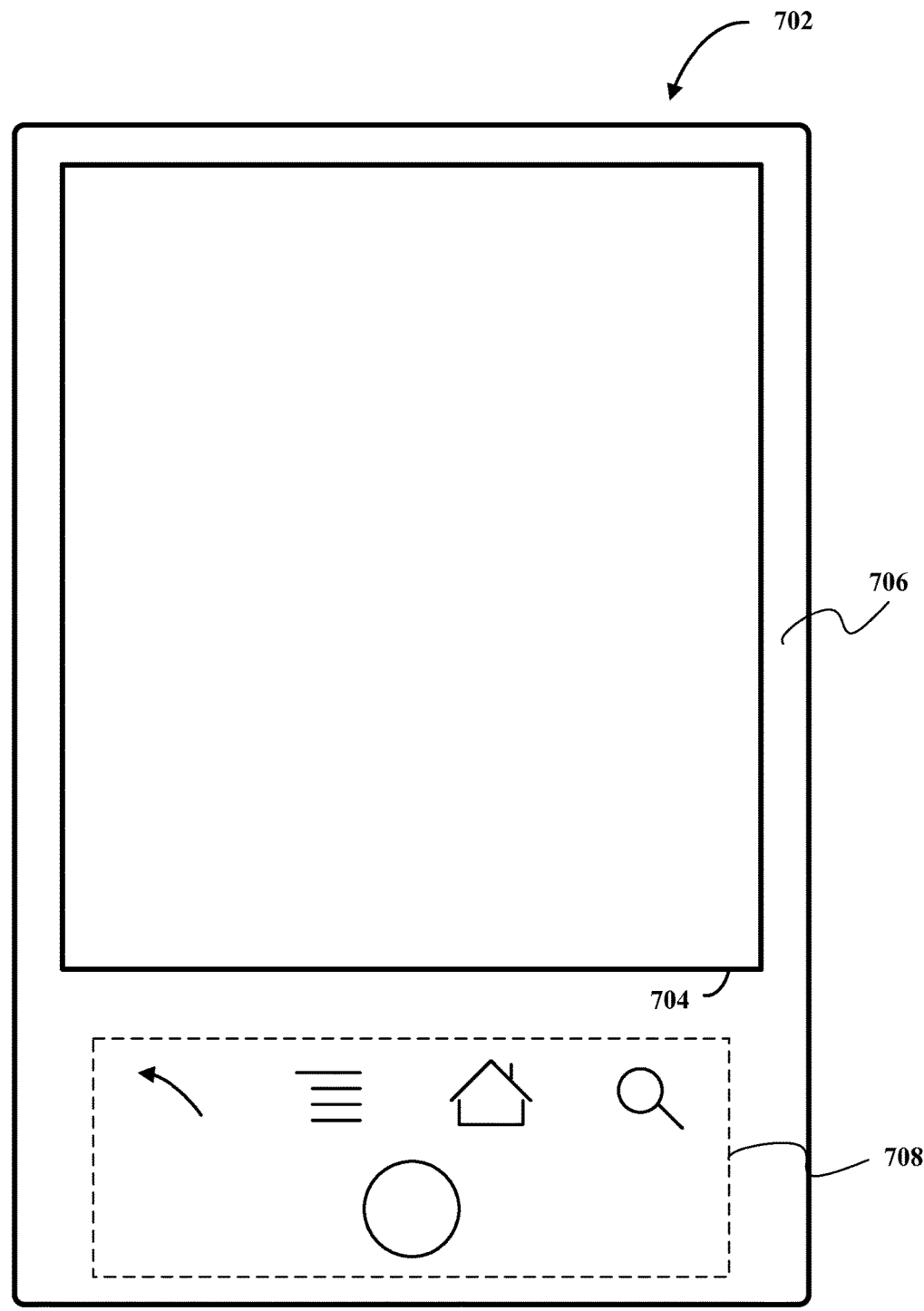
FIG. 7 shows an example system for dynamic capture of experience data.

FIG. 7 shows an example device for dynamic capture of experience data. It should be understood, however, that example mobile computing device 702 is shown for purposes of example and explanation only, and should not be taken to be limiting.

Example mobile computing device 702 is shown in the form of a cell phone that includes user-interface 704. While FIG. 7 depicts cell phone 702 as an example of a mobile computing device, other types of portable computing devices could additionally or alternatively be used (e.g. a tablet device, among other examples). As illustrated in FIG. 7, cell phone 702 includes a rigid frame 706, a plurality of input buttons 708, and user-interface 704. User-interface 704 may be a touchscreen, having a touchpad configured to receive touch inputs embedded into a graphical display, and may be arranged to depict various input areas. Alternatively, user-interface 704 may be a trackpad, having a touchpad configured to receive touch inputs, but no graphical display.

As noted, the example mobile computing device 702 may include plurality of input buttons 708 as well as user-interface 704, although this is not necessary. In another embodiment, for example, example mobile computing device 702 may include only user-interface 704 and not plurality of buttons 708. Mobile computing device 702 may be communicatively coupled ton HMD such as that described herein. Other embodiments of example mobile computing device 702 may be possible as well.

c. Example Network Architecture and Computing Architecture

Figure 8A:
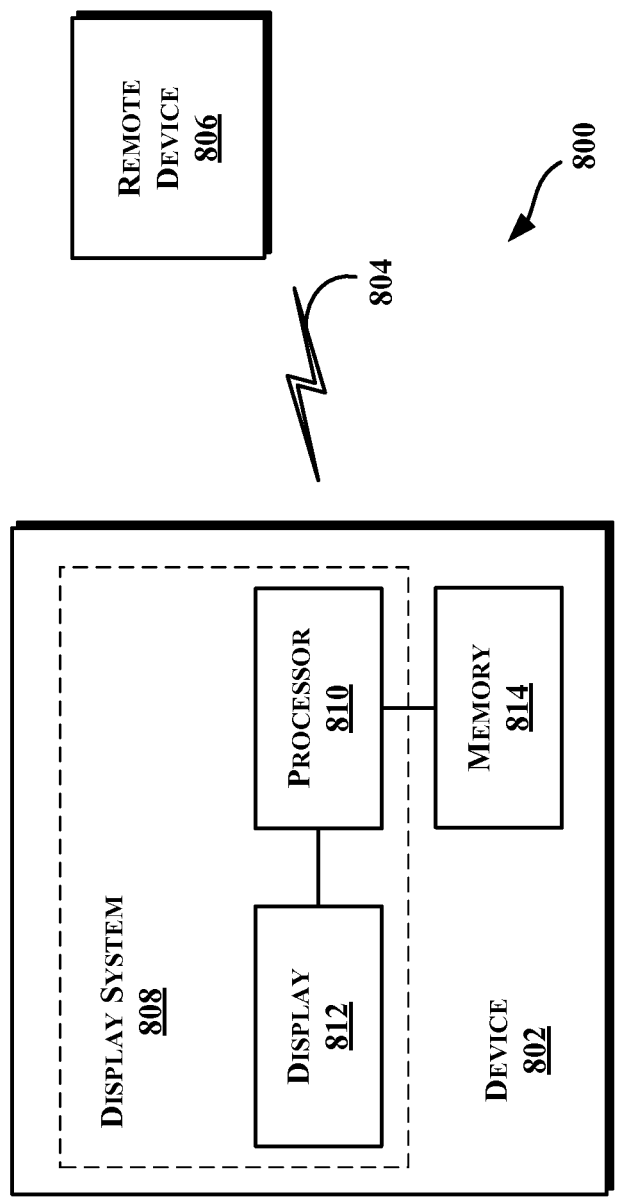
FIG. 8A shows a simplified block diagram of an example computer network infrastructure.

FIG. 8A shows a simplified block diagram of an example computer network infrastructure. In system 800, a device 802 communicates using a communication link 804 (e.g., a wired or wireless connection) to a remote device 806. The device 802 may be any type of device that can receive data and display information corresponding to or associated with the data. For example, the device 802 may be a heads-up display system, such as the head-mountable device 602, 652, or 672 described with reference to FIGS. 6A-6F.

Thus, the device 802 may include a display system 808 comprising a processor 810 and a display 812. The display 812 may be, for example, an optical see-through display, an optical see-around display, or a video see-through display. The processor 810 may receive data from the remote device 806, and configure the data for display on the display 812. The processor 810 may be any type of processor, such as a micro-processor or a digital signal processor, for example.

The device 802 may further include on-board data storage, such as memory 814 coupled to the processor 810. The memory 814 may store software that can be accessed and executed by the processor 810, for example.

The remote device 806 may be any type of computing device or transmitter including a laptop computer, a mobile telephone, or tablet computing device, etc., that is configured to transmit data to the device 802. The remote device 802 and the device 802 may contain hardware to enable the communication link 804, such as processors, transmitters, receivers, antennas, etc.

In FIG. 8A, the communication link 804 is illustrated as a wireless connection; however, wired connections may also be used. For example, the communication link 804 may be a wired serial bus such as a universal serial bus or a parallel bus, among other connections. The communication link 804 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 806 may be accessible via the Internet and may include a computing cluster associated with a particular web service (e.g., social-networking, photo sharing, address book, etc.).

Figure 8B:
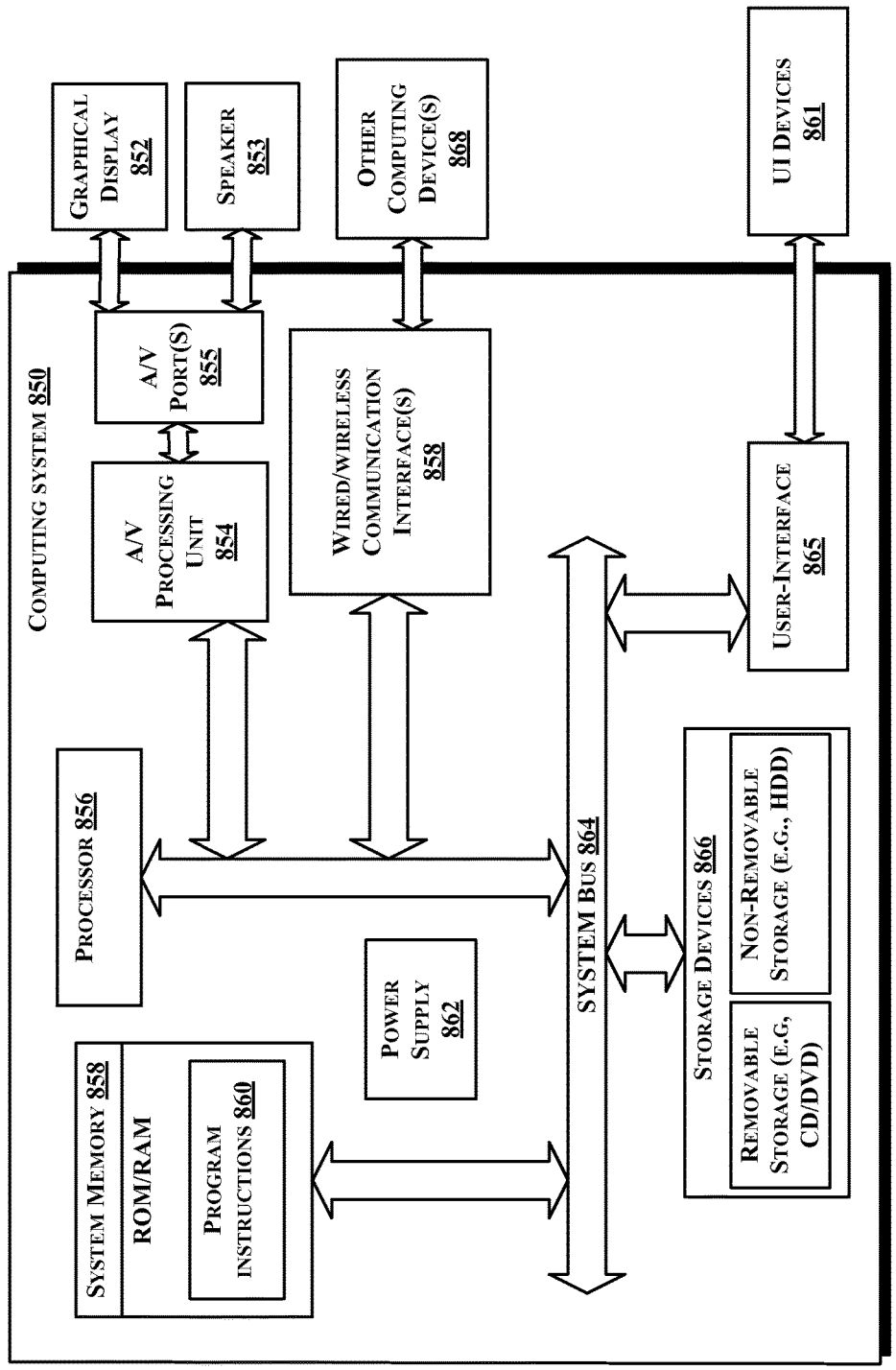
FIG. 8B shows a simplified block diagram depicting components of an example computing device for dynamic capture of experience data.

As described above in connection with FIGS. 8A-8F, an example wearable computing device may include, or may otherwise be communicatively coupled to, a computing device, such as computing device 850 (described further below). FIG. 8B shows a simplified block diagram depicting example components of an example computing device 850. One or both of the device 802 and the remote device 806 may take the form of computing device 850.

Computing device 850 may include at least one processor 856 and system memory 858. In an example embodiment, computing device 850 may include a system bus 864 that communicatively connects processor 856 and system memory 858, as well as other components of computing device 850. Depending on the desired configuration, processor 856 can be any type of processor including, but not limited to, a microprocessor (μP), a microcontroller (μC), a digital signal processor (DSP), or any combination thereof. Furthermore, system memory 858 can be of any type of memory now known or later developed including but not limited to volatile memory (such as RAM), non-volatile memory (such as ROM, flash memory, etc.) or any combination thereof.

An example computing device 850 may include various other components as well. For example, computing device 850 includes an A/V processing unit 854 for controlling graphical display 852 and speaker 853 (via A/V port 355), one or more communication interfaces 858 for connecting to other computing devices 868, and a power supply 862. Graphical display 852 may be arranged to provide a visual depiction of various input regions provided by user-interface module 865. For example, user-interface module 865 may be configured to provide a user-interface, and graphical display 852 may be configured to provide a visual depiction of the user-interface. User-interface module 865 may be further configured to receive data from and transmit data to (or be otherwise compatible with) one or more user-interface devices 861.

Furthermore, computing device 850 may also include one or more data storage devices 866, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing device 850.

According to an example embodiment, computing device 850 may include program instructions 860 that are stored in system memory 858 (and/or possibly in another data-storage medium) and executable by processor 856 to facilitate the various functions described herein including, but not limited to, those functions described with respect to FIGS. 1-4. Although various components of computing device 850 are shown as distributed components, it should be understood that any of such components may be physically integrated and/or distributed according to the desired configuration of the computing device.

d. Example Computer-Readable Medium

Figure 9:
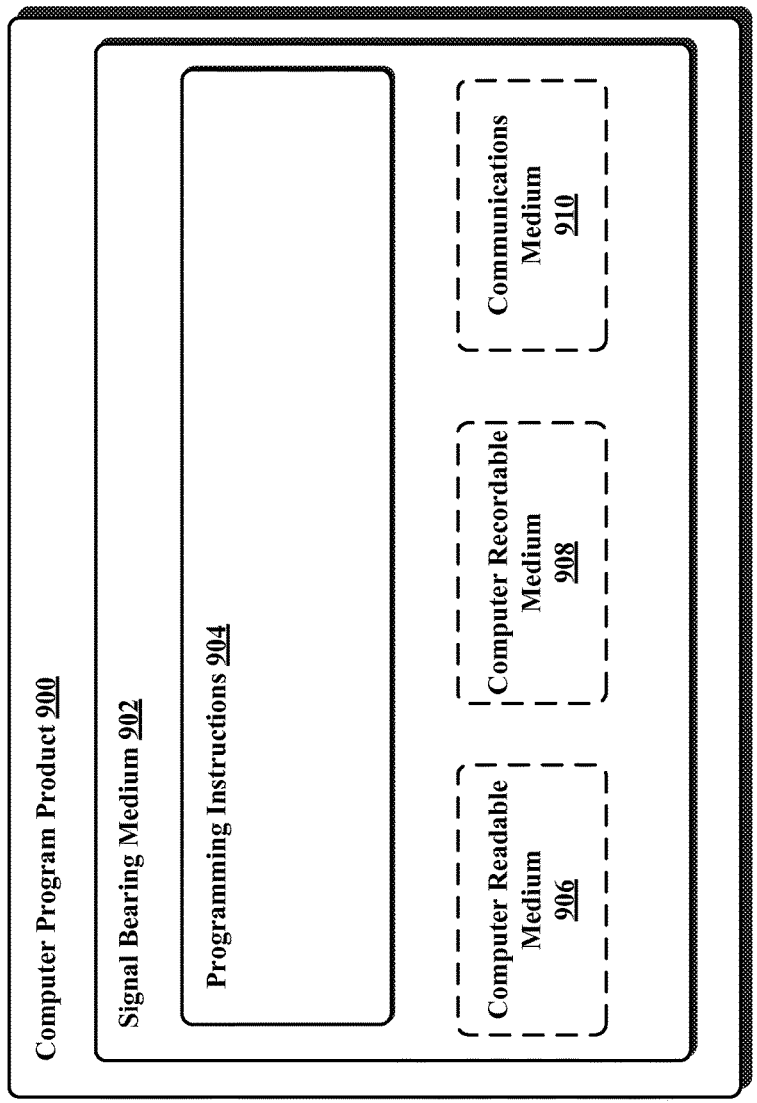
FIG. 9 shows an example computer-readable medium, according to an example embodiment.

In some embodiments, the disclosed methods may be implemented by computer program instructions encoded on a non-transitory computer-readable storage media in a machine-readable format, or on other non-transitory media or articles of manufacture. FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described with respect to FIGS. 1-4. In some examples, the signal bearing medium 902 may encompass a computer-readable medium 906, such as, but not limited to, a hard disk drive, a Compact Disc (CD), a Digital Video Disk (DVD), a digital tape, memory, etc. In some implementations, the signal bearing medium 402 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 850 of FIG. 8B may be configured to provide various operations, functions, or actions in response to the programming instructions 904 conveyed to the computer system 850 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a computing device such as any of those described above. Alternatively, the computing device that executes some or all of the stored instructions could be another computing device, such as a server.

4. CONCLUSION

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method comprising:
receiving first experience data that indicates a first environmental condition;
selecting a capture mode from a plurality of capture modes based on at least the first environmental condition, wherein the capture mode defines a manner of capturing experience data;
causing a computing device to operate in the selected capture mode, wherein operating in the selected capture mode comprises capturing second experience data in the manner defined by the capture mode;
while the computing device is operating in the selected capture mode, receiving third experience data that indicates a second environmental condition, wherein the first and second environmental conditions are external to and independent of a user of the computing device;
determining that the capture mode should be exited based on at least the received third experience data; and
based on the determination that the capture mode should be exited, causing the computing device to exit the capture mode such that at least one type of received experience data is no longer captured.

2. The method of claim 1, wherein the first experience data and the third experience data comprise at least one of (i) audio data, (ii) video data, (iii) motion data, (iv) location data, (v) temporal data, (vi) calendar-event data, (vii) lighting data, or (viii) other-device-capture data.

3. The method of claim 1, wherein selecting the capture mode further comprises (i) determining a first context based on at least the first experience data and (ii) selecting the capture mode based on the determined first context, and wherein determining that the capture mode should be exited comprises (i) determining a second context based on the third experience data and (ii) determining that the capture mode should be exited based on the determined second context.

4. The method of claim 1, further comprising:
receiving capture-save data;
determining that a portion of the captured second experience data should be saved based on at least the received capture-save data; and
saving the portion of the captured second experience data.

5. The method of claim 1, wherein the second experience data comprises at least one of (a) video data, wherein the capture mode defines a video frame rate or a video resolution, and wherein operating in the selected capture mode further comprises capturing the second experience data at the video frame rate or the video resolution defined by the capture mode, (b) image data, wherein the capture mode defines an image capture rate or an image resolution, and wherein operating in the selected capture mode further comprises capturing the second experience data at the image capture rate or the image resolution defined by the capture mode, (c) audio data, wherein the capture mode defines an audio sample rate, and wherein operating in the selected capture mode further comprises capturing the second experience data at the audio sample rate defined by the capture mode, (d) location data, wherein the capture mode defines a location-capture rate, and wherein operating in the selected capture mode further comprises capturing the second experience data at the location-capture rate defined by the capture mode, or (e) user-input data, wherein the capture mode defines a user-input-capture rate, and wherein operating in the selected capture mode further comprises capturing the second experience data at the user-input-capture rate defined by the capture mode.

6. The method of claim 1, further comprising:
after selecting the capture mode, providing a prompt to enter the capture mode, wherein selection of the prompt causes the computing device to operate in the selected capture mode; and
after providing the prompt, receiving input data indicating a selection of the prompt, wherein causing the computing device to operate in the selected capture mode comprises causing the computing device to operate in the selected capture mode based on the received input data.

7. A method comprising:
receiving, by a computing device, first experience data that indicates at least one environmental condition that is external to and independent of a user of the computing device;
selecting, by the computing device, a capture mode from a plurality of capture modes based on the at least one environmental condition, wherein the capture mode defines a frame rate for capturing video or image data; and
providing a prompt to the user to enter the capture mode, wherein selection of the prompt by the user causes the computing device to operate in the selected capture mode, and wherein operating in the selected capture mode comprises capturing second experience data at the frame rate defined by the capture mode.

8. The method of claim 7, further comprising:
receiving input data indicating a selection of the prompt; and
based on the received input data, causing the computing device to operate in the selected capture mode.

9. The method of claim 7, wherein the prompt indicates the frame rate for capturing the second experience data.

10. The method of claim 7, wherein the first experience data comprises at least one of (i) audio data, (ii) video data, (iii) motion data, (iv) location data, (v) temporal data, (vi) calendar-event data, (vii) lighting data, or (viii) other-device-capture data.

11. The method of claim 7, wherein selecting the capture mode further comprises:
determining a first context based on at least the first experience data; and
selecting the capture mode based on the determined first context.

12. The method of claim 7, further comprising:
while the computing device is operating in the selected capture mode, receiving third experience data that indicates a second environmental condition that is external to and independent of the user of the computing device;
determining that the capture mode should be exited based on at least the received third experience data; and
based on the determination that the capture mode should be exited, causing the computing device to exit the capture mode such that at least one type of received experience data is no longer captured.

13. The method of claim 12, wherein the third experience data comprises at least one of (i) audio data, (ii) video data, (iii) motion data, (iv) location data, (v) temporal data, (vi) calendar-event data, (vii) lighting data, or (viii) other-device-capture data.

14. A non-transitory computer readable medium having instructions stored thereon, the instructions comprising:
instructions for receiving, by a computing device, first experience data that indicates at least one environmental condition that is external to and independent of a user of the computing device;
instructions for selecting, by the computing device, a capture mode from a plurality of capture modes based on the at least one environmental condition, wherein the capture mode defines a frame rate for capturing video or image data; and
instructions for providing a prompt to the user to enter the capture mode, wherein selection of the prompt by the user causes the computing device to operate in the selected capture mode, and wherein operating in the selected capture mode comprises capturing second experience data at the frame rate defined by the capture mode.

15. The non-transitory computer readable medium of claim 14, the instructions further comprising:
instructions for receiving input data indicating a selection of the prompt; and
instructions for, based on the received input data, causing the computing device to operate in the selected capture mode.

16. The non-transitory computer readable medium of claim 14, wherein the prompt indicates the frame rate for capturing the second experience data.

17. The non-transitory computer readable medium of claim 14, wherein the first experience data comprises at least one of (i) audio data, (ii) video data, (iii) motion data, (iv) location data, (v) temporal data, (vi) calendar-event data, (vii) lighting data, or (viii) other-device-capture data.

18. The non-transitory computer readable medium of claim 14, wherein selecting the capture mode further comprises:
determining a first context based on at least the first experience data; and
selecting the capture mode based on the determined first context.

19. The non-transitory computer readable medium of claim 14, the instructions further comprising:
instructions for, while the computing device is operating in the selected capture mode, receiving third experience data that indicates a second environmental condition that is external to and independent of the user of the computing device;
instructions for determining that the capture mode should be exited based on at least the received third experience data; and
instructions for, based on the determination that the capture mode should be exited, causing the computing device to exit the capture mode such that at least one type of received experience data is no longer captured.

20. The non-transitory computer readable medium of claim 19, wherein the third experience data comprises at least one of (i) audio data, (ii) video data, (iii) motion data, (iv) location data, (v) temporal data, (vi) calendar-event data, (vii) lighting data, or (viii) other-device-capture data.

\* \* \* \* \*